(12) United States Patent
Fukuda

(10) Patent No.: US 6,928,570 B2
(45) Date of Patent: Aug. 9, 2005

(54) SYSTEM CLOCK SYNCHRONIZATION CIRCUIT

(75) Inventor: Seiki Fukuda, Kanagawa (JP)

(73) Assignee: NEC Electronics Corporation, Kawasaki (JP)

( * ) Notice: Subject to any disclaimer, the term of this patent is extended or adjusted under 35 U.S.C. 154(b) by 526 days.

(21) Appl. No.: 10/228,653

(22) Filed: Aug. 27, 2002

(65) Prior Publication Data

US 2003/0043944 A1 Mar. 6, 2003

(30) Foreign Application Priority Data

Aug. 28, 2001 (JP) .................................... 2001-258188

(51) Int. Cl.[7] .............................................. G06F 1/12
(52) U.S. Cl. ..................... 713/400; 713/401; 716/6; 375/355; 375/371; 327/291
(58) Field of Search ................................. 713/400, 401; 375/355, 371; 327/291

(56) References Cited

U.S. PATENT DOCUMENTS

| | | | | |
|---|---|---|---|---|
| 5,528,187 A | * | 6/1996 | Sato et al. ................... | 327/292 |
| 5,969,552 A | * | 10/1999 | Lee et al. .................... | 327/158 |
| 5,990,811 A | * | 11/1999 | Morimoto ..................... | 341/61 |
| 5,991,844 A | * | 11/1999 | Khosrowpour ............... | 710/312 |
| 6,031,402 A | * | 2/2000 | Wang et al. ................ | 327/157 |
| 6,184,733 B1 | * | 2/2001 | Wang et al. ................ | 327/157 |
| 6,512,473 B2 | * | 1/2003 | Sasaki ......................... | 341/159 |
| 6,519,709 B1 | * | 2/2003 | Kawauchi .................... | 713/400 |
| 6,539,070 B1 | * | 3/2003 | Kakura et al. .............. | 375/355 |
| 6,597,627 B2 | * | 7/2003 | Arata et al. ................. | 365/233 |
| 6,651,231 B2 | * | 11/2003 | Morikawa ...................... | 716/6 |

FOREIGN PATENT DOCUMENTS

| | | | | |
|---|---|---|---|---|
| JP | 04036673 A | * | 2/1992 | .......... G01R/31/28 |
| JP | 2000113671 | * | 4/2000 | ......... G11C/11/407 |
| JP | 02002164771 A | * | 6/2002 | ............. H03K/5/14 |

* cited by examiner

*Primary Examiner*—A. Elamin
(74) *Attorney, Agent, or Firm*—Katten Muchin Rosenman LLP

(57) ABSTRACT

A system clock synchronization circuit according to the present invention includes: a first synchronization and timing delay circuit synchronizing an input clock with a system clock and sending out a first signal which is obtained by delaying the synchronized signal by a first delay amount; an input data latching means for latching input data which changes at a first changing point of the input clock, the latching being in synchronization with a second changing point of the input clock; an input enable signal latching means for latching in synchronization with the input clock an input enable signal which is active when the input data is valid and inactive when the input data is invalid; and a mask signal generation circuit generating in synchronization with the first signal a mask signal which has a prescribed pulse width.

13 Claims, 17 Drawing Sheets

SYSTEM CLOCK SYNCHRONIZATION CIRCUIT

BACKGROUND OF THE INVENTION

1. Field of the Invention

The present invention relates to a system clock synchronization circuit, and more particularly, to a system synchronization circuit which, even in the case where noise is superimposed on the clock signal received, is capable of supplying correct input data and a correct input enable signal in synchronization with the system clock, which are to be supplied to circuits downstream of the system clock synchronization circuit comprising a digital broadcast reception device.

2. Description of the Related Art

As illustrated in FIG. 12, a digital broadcast reception device includes: a tuner 121 which receives a broadcast signal and selects a channel; an A/D converter 122A which converts an output signal from the tuner 121 to a digital signal; a demodulation circuit 122B which demodulates a digital signal from the A/D converter 122A; an error correction circuit 122C which corrects error data created in the transmission paths; buffers 123A, 123B and 123C; a system clock synchronization circuit 124; a stream separation circuit 125; and an MPEG decoder 126.

Here, the A/D converter 122A, the demodulation circuit 122B and the error correction circuit 122C constitute a reception signals preprocessing circuit 122, which sends out reception data Sdata', a reception enable signal Sen' and reception clock CLK'.

The reception data Sdata', the reception enable signal Sen' and the reception clock CLK' are driven by the buffers 123A, 123B and 123C, which momentarily come to have high impedance on the rising and the falling edges, and enter the system clock synchronization circuit 124 as input data Sdata, an input enable signal Sen and input clock CLK, respectively.

The system clock synchronization circuit 124 takes in the input data Sdata, the input enable signal Sen, the input clock CLK and the system clock SCLK, and sends out output data Vdata which is obtained by synchronizing the input data with the system clock SCLK and an output enable signal Ven which is synchronized with the system clock SCLK.

The stream separation circuit 125 takes in the output data Vdata and the output enable signal Ven and separates multiplex stream data into individual stream data, which is then decoded by the MPEG decoder 126 according to the MPEG format.

Next, the operation of the system clock synchronization circuit 124 illustrated in FIG. 12 will be described more specifically with reference to a timing chart illustrated in FIG. 13.

The reception data Sdata' and the reception enable signal Sen' are sent out from the reception signals preprocessing circuit 122 in such a manner that they are synchronized with the reception clock CLK' and change on the falling edge of the reception clock CLK'. That is, the reception data Sdata' and the reception enable signal Sen' represent data in units of one reception clock CLK'.

The reception data Sdata' includes valid data which is used by the MPEG decoder 126 during decoding and invalid data which is on the other hand discarded. In FIG. 13, the invalid data is designated by hatched lines stroked down to the lower left. When the reception enable signal Sen' becomes active, that is, is set as "1" in the case of FIG. 13, the valid data is sent out from the reception signals preprocessing circuit 122. When the reception enable signal Sen' becomes inactive, that is, is set as "0" in the case of FIG. 13, the invalid data is sent out from the reception signals preprocessing circuit 122. Hatched lines stroked down to the lower left appearing in the input data Sdata and the output data Vdata also designate invalid data.

In FIG. 13, when the reception enable signal Sen' synchronizes to the falling edge of the reception clock CLK' and becomes "1" at time t2, the reception data Sdata' changes from invalid data to valid data 1, and this valid data 1 is driven by the buffer 123A and enters the system clock synchronization circuit 124 as the input data Sdata. Similarly, the reception enable signal Sen' which becomes "1" at time t2 is driven by the buffer 123B and enters the system clock synchronization circuit 124 as the input enable signal Sen with a delay due to the buffer 123B.

Next, at time t3, synchronizing to the rising edge of the input clock CLK, the system clock synchronization circuit 124 takes in the valid data 1. Then at time t4, synchronizing to the system clock SCLK, the system clock synchronization circuit 124 sends out this data to the stream separation circuit 125 as the output data Vdata.

The output enable signal Ven which rises to "1" at time t4 is generated by the system clock synchronization circuit 124 as a pulse signal which keeps "1" for one cycle duration of the system clock SCLK and is sent out to the stream data separation circuit 125 while synchronizing to the system clock SCLK.

Similarly, at time t6, synchronizing to the rising edge of the input clock CLK, the system clock synchronization circuit 124 takes in valid data 2 and, synchronizing to the system clock SCLK at time t7, sends out this data to the stream separation circuit 125 as the output data Vdata.

The output enable signal Ven which rises to "1" at time t7 is generated by the system clock synchronization circuit 124 as a pulse signal which keeps "1" for one cycle duration of the system clock SCLK and sent out to the stream data separation circuit 125 while synchronizing to the system clock SCLK.

As described above, the input data Sdata, the input enable signal Sen and the input clock CLK are synchronized to the system clock SCLK, and are sent out from the system clock synchronization circuit 124 to the stream separation circuit 125 as the output data Vdata and the output enable signal Ven, both of which have been synchronized to the system clock SCLK.

Next, details of the system clock synchronization circuit 124 will be described with reference to FIG. 14.

The system clock synchronization circuit 124 illustrated in FIG. 14 comprises: a flip-flop circuit 141 which takes in the input enable signal Sen and operates in synchronization with the input clock CLK; a flip-flop circuit 142 which takes in the input data Sdata and operates in synchronization with the input clock CLK; an OR gate 143 which takes in the reset signal as one input; a synchronization circuit 144 which sends out a signal S2 which is obtained by synchronizing a signal S1 sent out from the flip-flop circuit 141 with the system clock signal SCLK; a mask signal generation circuit 145 which takes in the signal S2 and generates a mask signal S5 having a pulse width of one cycle duration of the system clock SCLK; a flip-flop circuit 146 which takes in the mask signal S5 and sends out the output enable signal Ven while synchronizing to the system clock SCLK; and a write enable flip-flop circuit 147 which takes in the mask signal S5 at the write enable terminal we, takes in the output signal S6 from the flip-flop circuit 142 and sends out the output data Vdata while synchronizing to the system clock SCLK. The mask signal generation circuit 145 sends out the mask signal S5 to the OR gate 143 and, when the mask signal S5 assumes the value "1", resets the flip-flop circuit 141 through the OR gate 143.

Here, if the mask signal S5 is "1", then the write enable flip-flop circuit 147 operates as a typical flip-flop circuit, and if "0", then it does not latch input data but keeps previous data. Moreover, a reset signal Rset becomes active, resetting the whole system, before the start of the reception by a digital broadcast reception device. The reset signal is cancelled later.

Next, an example of the mask signal generation circuit 145 will be described with reference to FIG. 15. Here, the synchronization circuit 144 of FIG. 14 is constituted of the flip-flop circuit 1441 illustrated in FIG. 15.

The mask signal generation circuit 145 illustrated in FIG. 15 comprises:
a flip-flop circuit 1451 which sends out a signal S3 which is obtained by synchronizing the signal S2 with system clock SCLK from the flip-flop circuit 1441;
a flip-flop circuit 1452 which sends out a signal S4 which is obtained by synchronizing, the signal S3 with system clock SCLK from the flip-flop circuit 1451; an inverter 1453; and an AND gate 1454.

Here, the flip-flop circuit 1452, the inverter 1453 and the AND gate 1454 generate a mask signal S5 which synchronizes to the rising edge of the signal S3 and has a pulse width of one cycle duration of the system clock SCLK.

Next, the normal operation of the system clock synchronization circuit 124 illustrated in FIGS. 14 and 15 will be described with reference to a timing chart shown in FIG. 16.

In FIG. 16, the input data Sdata changes from invalid data to valid data 1 and enters the system clock synchronization circuit 124 at time t10, and changes from valid data 1 to valid data 2 and enters the system clock synchronization circuit 124 at time t13.

However, as shown in FIG. 12, since the input data Sdata and the input enable signal Sen are those which are driven and generated by the buffers 123A and 123B which come to have high impedance on the falling edge of the input clock CLK, they become indeterminate data on the falling edge of the input clock CLK.

In FIG. 16, these indeterminate data are designated by hatched lines stroked down to the lower right. As shown in the figure, the input data Sdata first changes from the valid data 1 to the indeterminate data and then to the valid data 2 before entering the system clock synchronization circuit 124.

Similarly, the input data Sdata first changes from the valid data 2 to the indeterminate data and then to the valid data 3, and enters the system clock synchronization circuit 124 while synchronizing to the input clock CLK. Similarly, the input enable signal Sen becomes indeterminate at times t10 and t13 on the falling edge of the input clock CLK as illustrated by the hatched lines stroked down to the lower right.

Next, at time t11, synchronizing to the rising edge of the input clock CLK, the flip-flop circuit 142 takes in the valid data 1, and sends it out as a signal S6 to the write enable flip-flop circuit 147. Furthermore, the flip-flop circuit 141 takes in data for which the input enable signal is "1" and sends it out as a signal S1 to the flip-flop circuit 1441.

Next, at time t12, the flip-flop circuit 1451 latches the "1" and sends out a signal S3 which rises to "1" at time t13, which is one cycle duration later of the system clock SCLK. The circuit which is constituted of the flip-flop circuit 1452, the inverter 1453 and the AND gate 1454 rises in synchronization with the rising of the signal S3, and sends out the mask signal S5 having a pulse width of one cycle duration of the system clock SCLK to the flip-flop circuit 146, the write enable terminal we of the write enable flip-flop circuit 147 and the OR gate 143. If the mask signal S5 becomes "1", then the flip-flop circuit 141 is reset through the OR gate 143 and fall to "0".

Moreover, at time t14, the flip-flop circuit 146 takes in the mask signal S5 of "1" level, and sends out the mask signal S5 of "0" level after one cycle duration of the system clock SCLK. In other words, the flip-flop circuit 146 sends out the output enable signal Ven which is obtained by delaying the mask signal S5 by one cycle duration of the system clock SCLK.

As described above, the input data Sdata, the input enable signal Sen and the input clock CLK, which enter the system clock synchronization circuit, are synchronized to the system clock SCLK and sent out from the system clock synchronization circuit 124 to the stream separation circuit 125 as the output data Vdata and the output enable signal Ven which are in synchronization with the system clock SCLK.

Next, the operation of the system clock synchronization circuit illustrated in FIGS. 14 and 15 in the case where noise is superimposed on the falling edge of the input clock CLK will be described with reference to FIG. 17.

First, the reason why noise is superimposed on the falling edge of the input clock CLK will be described. Since the input data Sdata and the input enable signal Sen are those which synchronize and change on the falling edge of the input clock CLK, the buffers 123A and 123B momentarily discharge a large current on the falling edge of the input clock CLK. This large current creates a pulse noise, which superimposes on the falling edge of the input clock CLK via crosstalk capacities between transmission paths for the input data Sdata and the input clock CLK and transmission paths for the input enable signal Sen and the input clock CLK.

When this takes place, the buffer 123C which drives the input clock CLK has come to have high impedance and is highly sensitive to a noise, being likely to pick up noises, and the input clock CLK becomes 0 and then jumps to 1 on the falling edge, momentarily exhibiting a pulsed wave shape as illustrated by A and B in FIG. 17.

In the system clock synchronization circuit illustrated in FIGS. 14 and 15, the input clock CLK directly enters the flip-flop circuits 141 and 142. Therefore, if a noise whose width is less than one cycle duration of the system clock SCLK is superimposed on the falling edge of the input clock CLK, then the flip-flop circuits 141 and 142 wrongly see it as the rising edge of the input clock CLK and latch the input data Sdata and the input enable signal Sen with wrong timing, resulting in the malfunction of the system clock synchronization circuit.

Next, the malfunction of the system clock synchronization circuit due to the noise will be described more specifically with reference to FIGS. 15 and 17.

At time t21, synchronizing to the input clock CLK, the flip-flop circuit 141 latches the input enable signal Sen which has become indeterminate and sends it out to the flip-flop circuit 1441 as the signal S1, and the flip-flop circuit 142 takes in the input data Sdata which has become indeterminate and sends it out to the write enable flip-flop circuit 147 as the signal S6.

Next, at time t22, synchronizing to the rising edge of the system clock SCLK, the flip-flop circuit 1451 latches the indeterminate data of the signal S1 and, at time t23 which is one cycle duration later of the system clock SCLK, sends it out to the flip-flop circuit 1452 as the output signal S3.

The circuit which is constituted of the flip-flop circuit 1452, the inverter 1453 and the AND gate 1454 latches the signal S3 and sends out to the flip-flop circuit 146 the indeterminate data of the mask signal S5 which has a pulse width of one cycle duration of the system clock SCLK. And, when the mask signal S5 becomes "1", the flip-flop circuit 141 is reset through the OR gate 143 and falls to "0".

Next, at time t24, synchronizing to the rising edge of the system clock SCLK, the write enable flip-flop circuit 147 latches indeterminate data of the signal S6 and sends it out as the output data Vdata. Moreover, synchronizing to the rising edge of the system clock SCLK, the flip-flop circuit 146 latches indeterminate data of the signal S5 and sends it out as the output enable signal Ven. At time t25, this output enable signal Ven changes to "0" in the flip-flop circuit 146, which is the result of latching the mask signal S5 of "0" level in synchronization with the rising edge of the system clock SCLK.

As described above, if a noise whose width is smaller than one cycle duration of the system clock SCLK is superimposed on the falling edge of the input clock CLK, then the flip-flop circuits 141 and 142 wrongly see it as the rising point of the input clock CLK, latches indeterminate data and sends them out to a next circuit. As a result, these indeterminate data successively transmits through the circuits, and the output data Vdata and the output enable data Ven which have become indeterminate end up being sent out to the stream separation circuit 125.

As a result, the stream separation circuit 125 and the MPEG decoder 126 which constitute a conventional digital broadcast reception device cannot process a mixture of normal data and indeterminate data, separating one from another, and operate in a wrong manner.

In the above-described conventional system clock synchronization circuit, the noise from onboard buffers is coped with inserting noise filters on board. However, the result of noise simulation to determine what sort of filters be placed where on board is far from representing the actual noise, and the truth is that designing board in a trial-and-error fashion is unavoidable.

For this reason, it would take a long period of time to reduce noise to a satisfactory level. It would also pose a problem with respect to production costs as it becomes necessary to add parts on board designed to reduced noise.

Accordingly, it is an object of the present invention that a system clock synchronization circuit be provided which does not send out wrong output data and a wrong output enable signal but is capable of sending out correct output data and a correct output enable signal in synchronization to the system clock even in the case where noise is superimposed on the input clock CLK.

BRIEF SUMMARY OF THE INVENTION
Objects of the Invention

It is an object of the present invention that a system clock synchronization circuit be provided which does not send out wrong output data and a wrong output enable signal but is capable of sending out correct output data and a correct output enable signal in synchronization to the system clock even in the case where noise is superimposed on the input clock CLK.

SUMMARY OF THE INVENTION

A system clock synchronization circuit according to the present invention includes: a first synchronization and timing delay circuit which synchronizes an input clock with a system clock and sends out the first signal which is obtained by delaying the synchronized signal by the first delay amount; an input data latching means for latching input data which changes at the first changing point of the input clock, the latching being in synchronization with the second changing point of the input clock; an input enable signal latching means for latching in synchronization with the input clock an input enable signal which is active when the input data is valid and inactive when the input data is invalid; a mask signal generation circuit which generates in synchronization with the first signal with a mask signal which has a prescribed pulse width; a second synchronization and timing delay circuit which synchronizes a signal sent out from the input data latching means with the system clock and sends out the second signal which is obtained by delaying the synchronized signal by the second delay amount; a third synchronization and timing delay circuit which synchronizes a signal sent out from the input enable signal latching means with the system clock and sends out the third signal which is obtained by delaying the synchronized signal by the third delay amount; a masking means for taking in the mask signal and the third signal, sending out the third signal when the mask signal is active, and masking the third signal when the mask signal is inactive; a first output latching means for latching in synchronization with the system clock the fourth signal from the masking means and sending out an output enable signal; and a second output latching means for taking in the fourth signal at a write enable terminal and the second signal at a data input terminal, latching in synchronization with the system clock the second signal when the fourth signal is active, and holding and sending out as output data the second signal which is taken immediately before when the fourth signal is inactive.

BRIEF DESCRIPTION OF THE DRAWINGS

The above-mentioned and other objects, features and advantages of this invention will become more apparent by reference to the following detailed description of the invention taken in conjunction with the accompanying drawings, wherein.

DETAILED DESCRIPTION OF THE INVENTION

Next, examples of the present invention will be described with reference to the drawings.

Figure 1:
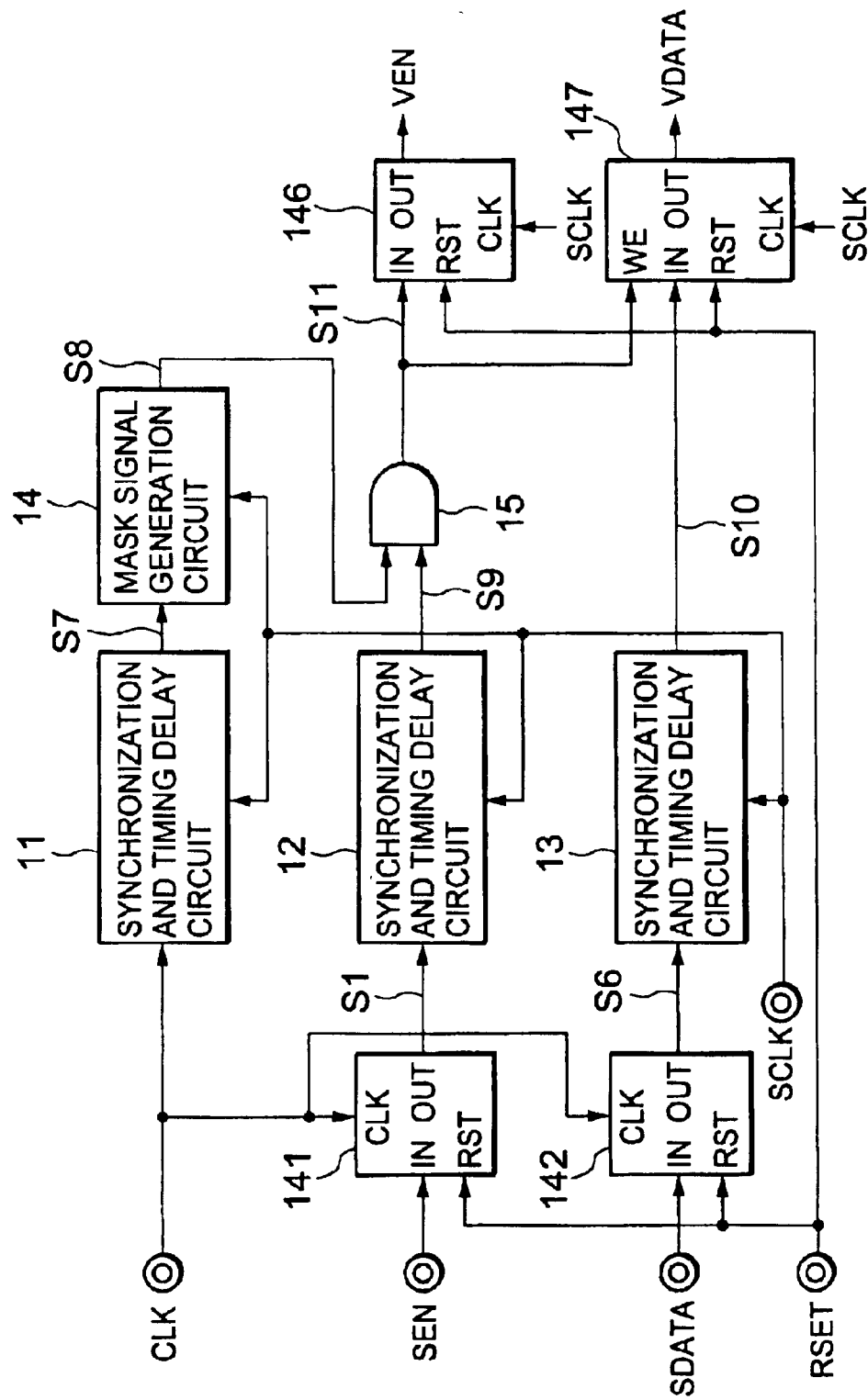
FIG. 1 is a block diagram illustrating the first example of the system clock synchronization circuit according to the present invention.
Figure 12:
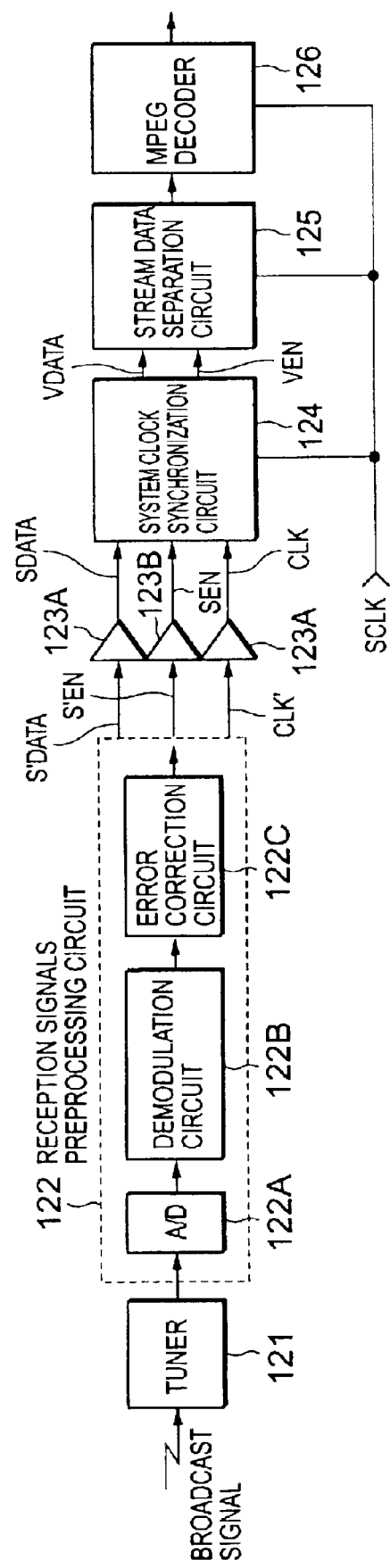
FIG. 12 is a block diagram illustrating a conventional digital broadcast reception device.
Figure 14:
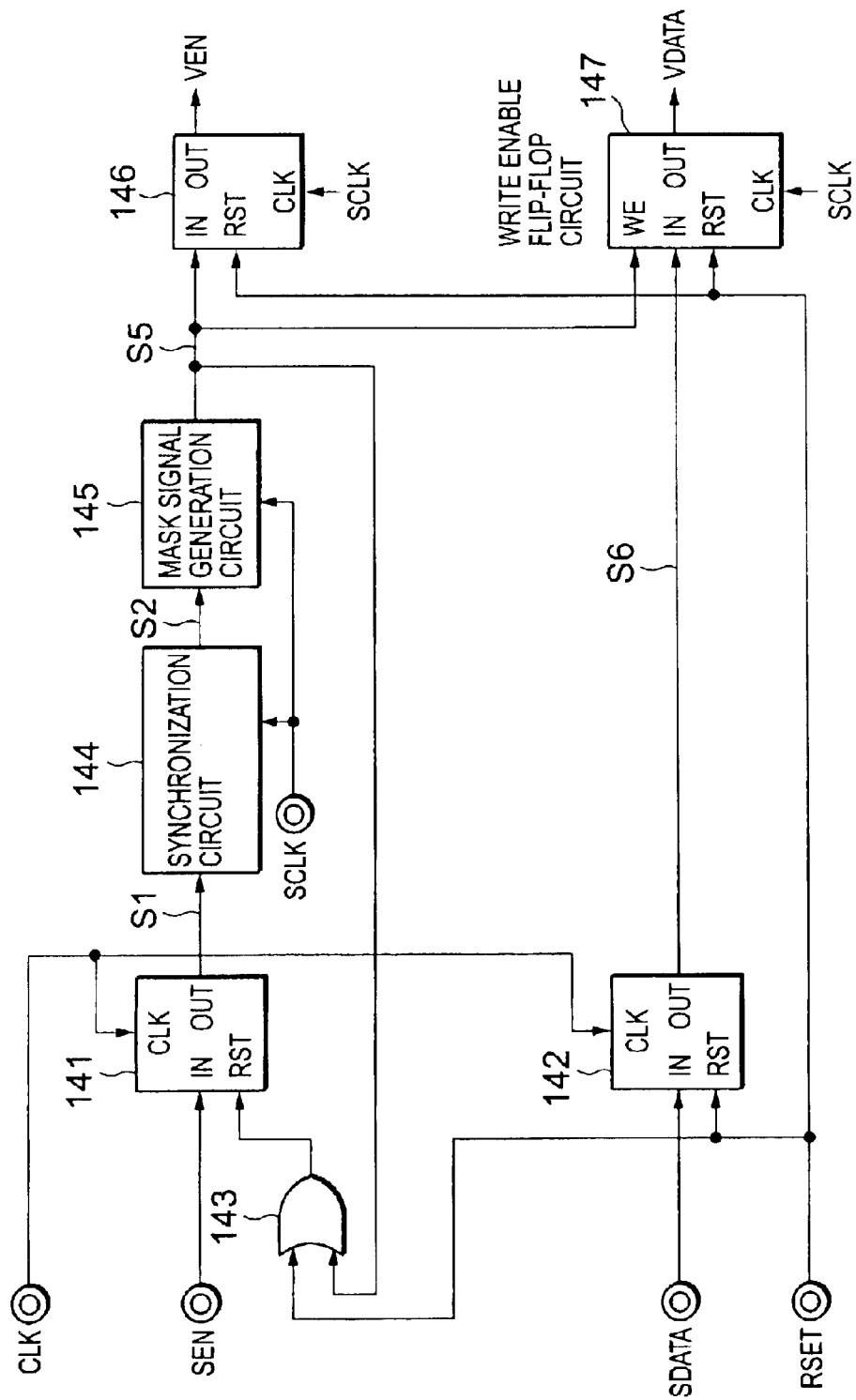
FIG. 14 is a block diagram of the conventional system clock synchronization circuit 124 illustrated in FIG. 12.
Figure 15:
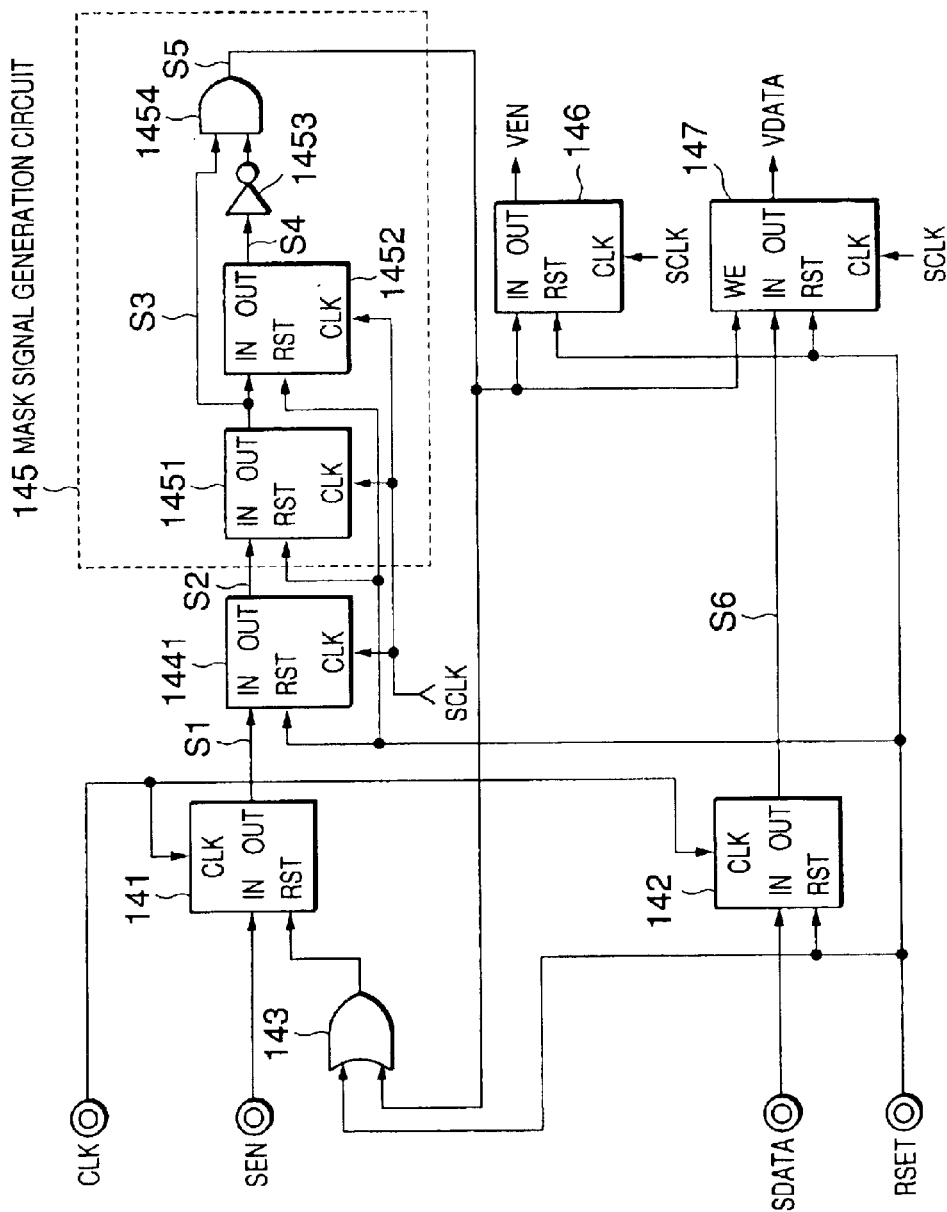
FIG. 15 is a detailed circuit diagram of the conventional system clock synchronization circuit 124 illustrated in FIG. 12.

FIG. 1 is a block diagram illustrating the first example of the system clock synchronization circuit according to the present invention, where the same reference characters and numbers designate the same constituent elements as in FIG. 14. Incidentally, a circuit configuration of a digital broadcast reception device mounted with the system clock synchronization circuit of the present invention is the same as that of FIG. 12.

The system clock synchronization circuit illustrated in FIG. 1 includes: a flip-flop circuit 141 which takes in the input enable signal Sen and operates in synchronization with the input clock CLK; and a flip-flop circuit 142 which takes in the input data Sdata and operates in synchronization with the input clock CLK.

Moreover, the system clock synchronization circuit illustrated in FIG. 1 further includes: a synchronization and timing delay circuit 11 which synchronizes the input clock CLK with the system clock SCLK and generates the signal S7 which is obtained by delaying this synchronized signal by the first delay amount in synchronization with the system clock SCLK; a synchronization and timing delay circuit 12 which synchronizes the signal S1 sent out from the flip-flop circuit 141 with the system clock SCLK and generates the signal S9 which is obtained by delaying this synchronized signal by the second delay amount in synchronization with the system clock SCLK; and a synchronization and timing delay circuit 13 which synchronizes the signal S6 sent out from the flip-flop circuit 142 with the system clock SCLK and generates the signal S10 which is obtained by delaying this synchronized signal by the third delay amount in synchronization with the system clock SCLK.

Moreover, the system clock synchronization circuit illustrated in FIG. 1 further includes: a mask signal generation circuit 14 which takes in the signal S7 and generates a mask signal S8 having a pulse width of one cycle duration of the system clock SCLK; an AND gate 15 which takes in the mask signal S8 and the signal S9; a flip-flop circuit 146 which takes in the signal S11 sent out from the AND gate 15 and sends out in synchronization with the system clock SCLK the output enable signal Ven; and a write enable flip-flop circuit 147 which takes in the signal S11 at the write enable terminal we, takes in the signal S10 and sends out in synchronization with the system clock SCLK the output data Vdata.

Next, examples of the synchronization and timing delay circuits 11, 12 and 13 and the mask signal generation circuit 14 illustrated in FIG. 1 will be described with reference to FIG. 2. The synchronization and timing delay circuit 11 illustrated in FIG. 2 includes: a flip-flop circuit 111 which sends out the signal S111 which is obtained by synchronizing the input clock CLK with the system clock SCLK; a flip-flop circuit 112 which sends out the signal S112 which is obtained by synchronizing the signal S111 from the flip-flop circuit 111 with the system clock SCLK; and a flip-flop circuit 113 which sends out the signal S7 which is obtained by synchronizing the signal S112 with the system clock SCLK.

Moreover, the synchronization and timing delay circuit 12 includes: a flip-flop circuit 121 which sends out the signal S121 which is obtained by synchronizing the signal S1 sent out from the flip-flop circuit 141 with the system clock SCLK; and a flip-flop circuit 122 which sends out the signal S9 which is obtained by synchronizing the signal S121 sent out from the flip-flop circuit 121 to the system clock SCLK.

Moreover, the synchronization and timing delay circuit 13 has a circuit configuration similar to the synchronization and timing delay circuit 12, including: a flip-flop circuit 131 which sends out the signal S131 which is obtained by synchronizing the signal S6 sent out from the flip-flop circuit 142 with the system clock SCLK; and a flip-flop circuit 132 which sends out the signal S10 which is obtained by synchronizing the signal S131 sent out from the flip-flop circuit 131 to the system clock SCLK.

Moreover, the mask signal generation circuit 14 includes: a flip-flop circuit 141' which sends out the signal S141 which is obtained by synchronizing the signal S7 from the flip-flop circuit 113 with the system clock SCLK; an inverter 142'; and an AND gate 143'. Here, the flip-flop circuit 141', the inverter 142' and the AND gate 143' operate together to generate the mask signal S8 which synchronizes to the rising edge of the signal S7 and has a pulse width of one cycle duration of the system clock SCLK.

Figure 3:
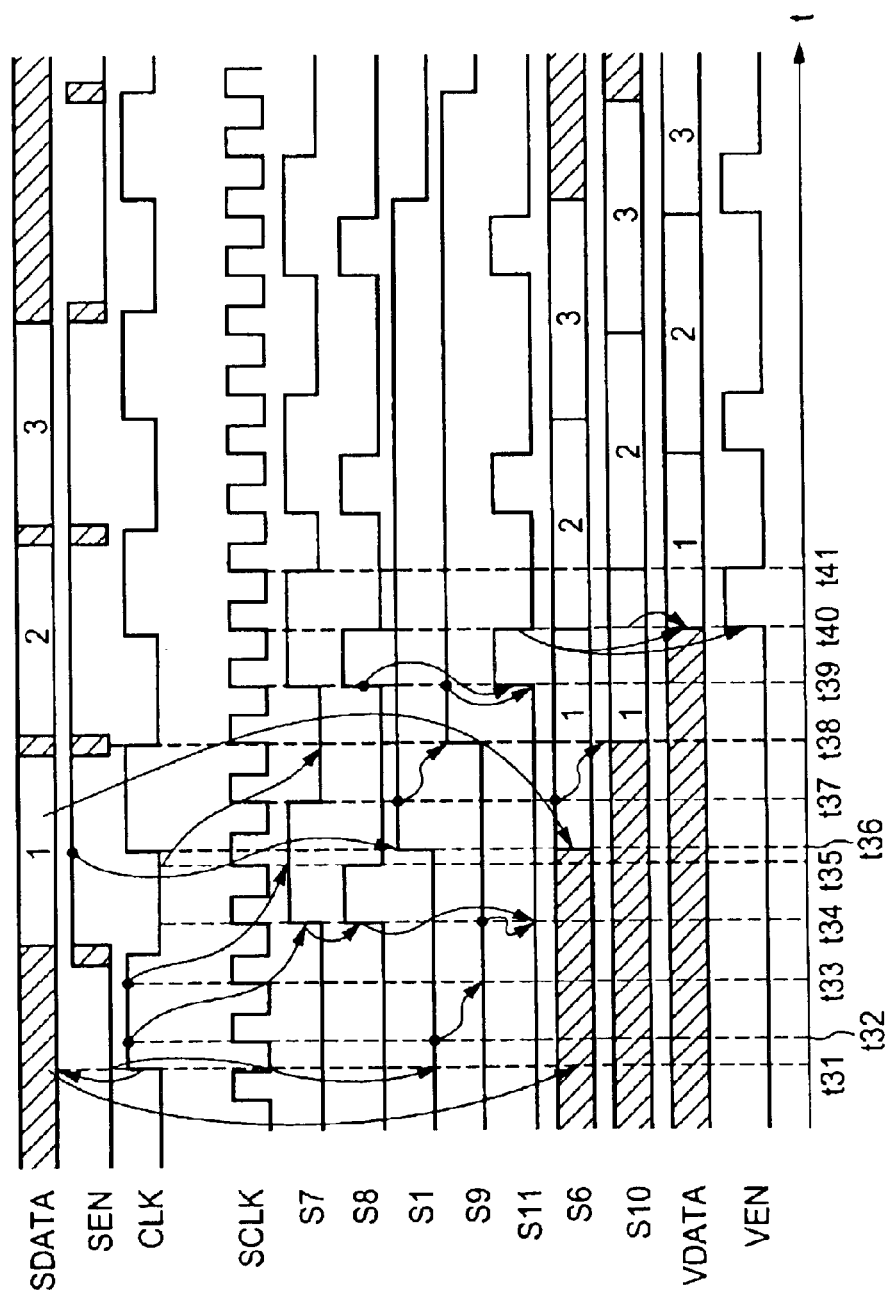
FIG. 3 is a timing chart for the system clock synchronization circuit illustrated in FIG. 1 in the case where no noise is superimposed on the input clock CLK.
Figure 13:
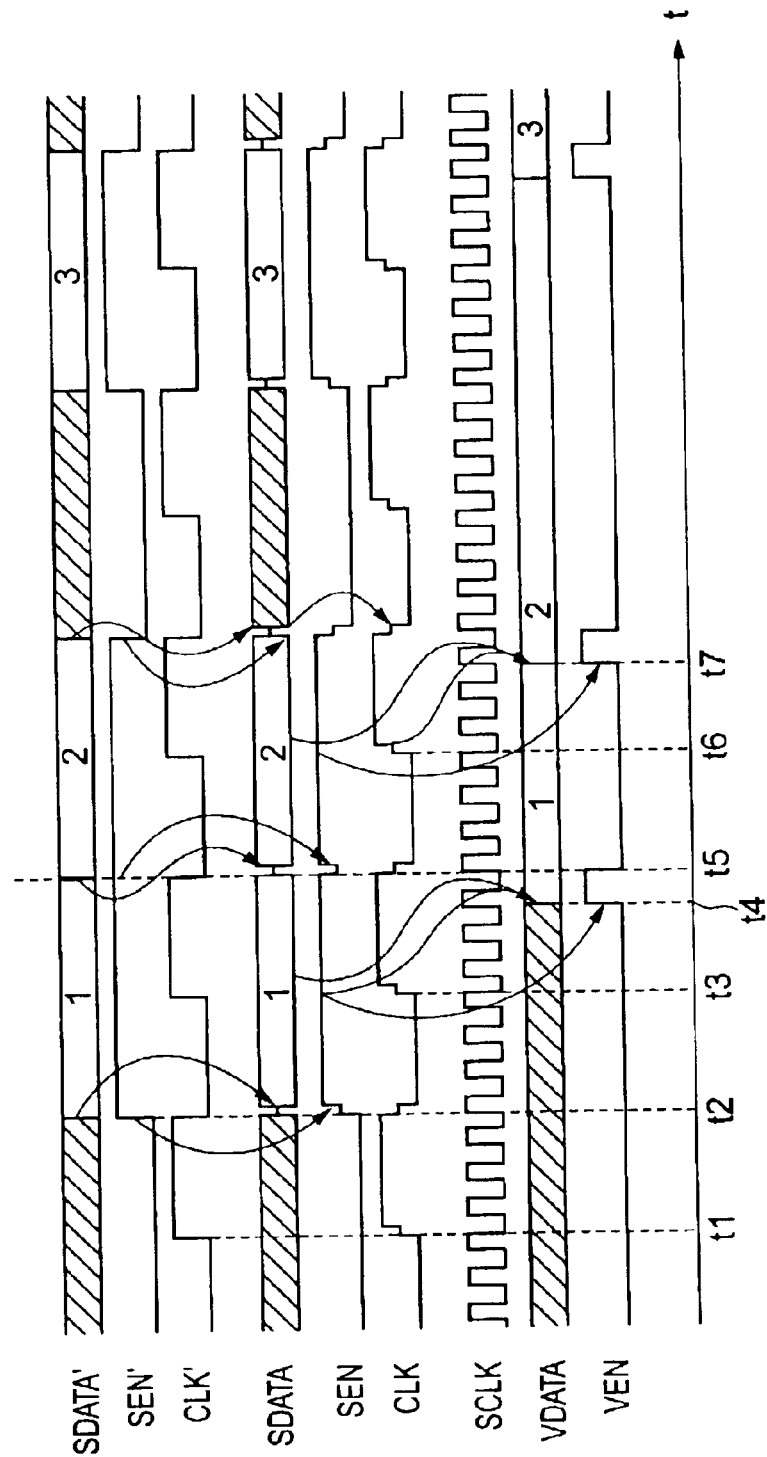
FIG. 13 is a timing chart for the conventional system clock synchronization circuit 124 illustrated in FIG. 12.
Figure 16:
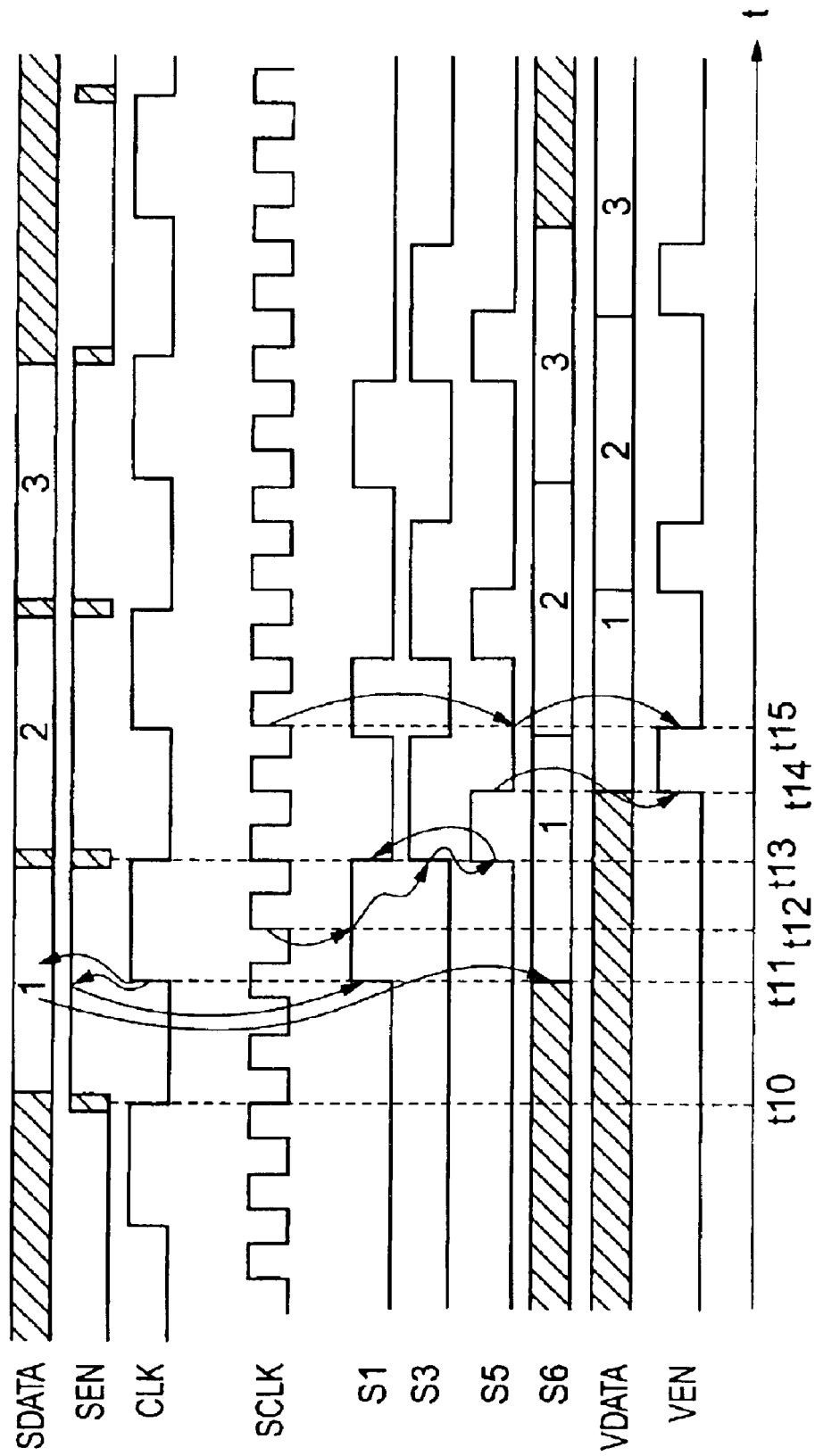
FIG. 16 is a timing chart for the system clock synchronization circuit 124 illustrated in FIG. 15 in the case where no noise is superimposed on the input clock CLK.
Figure 17:
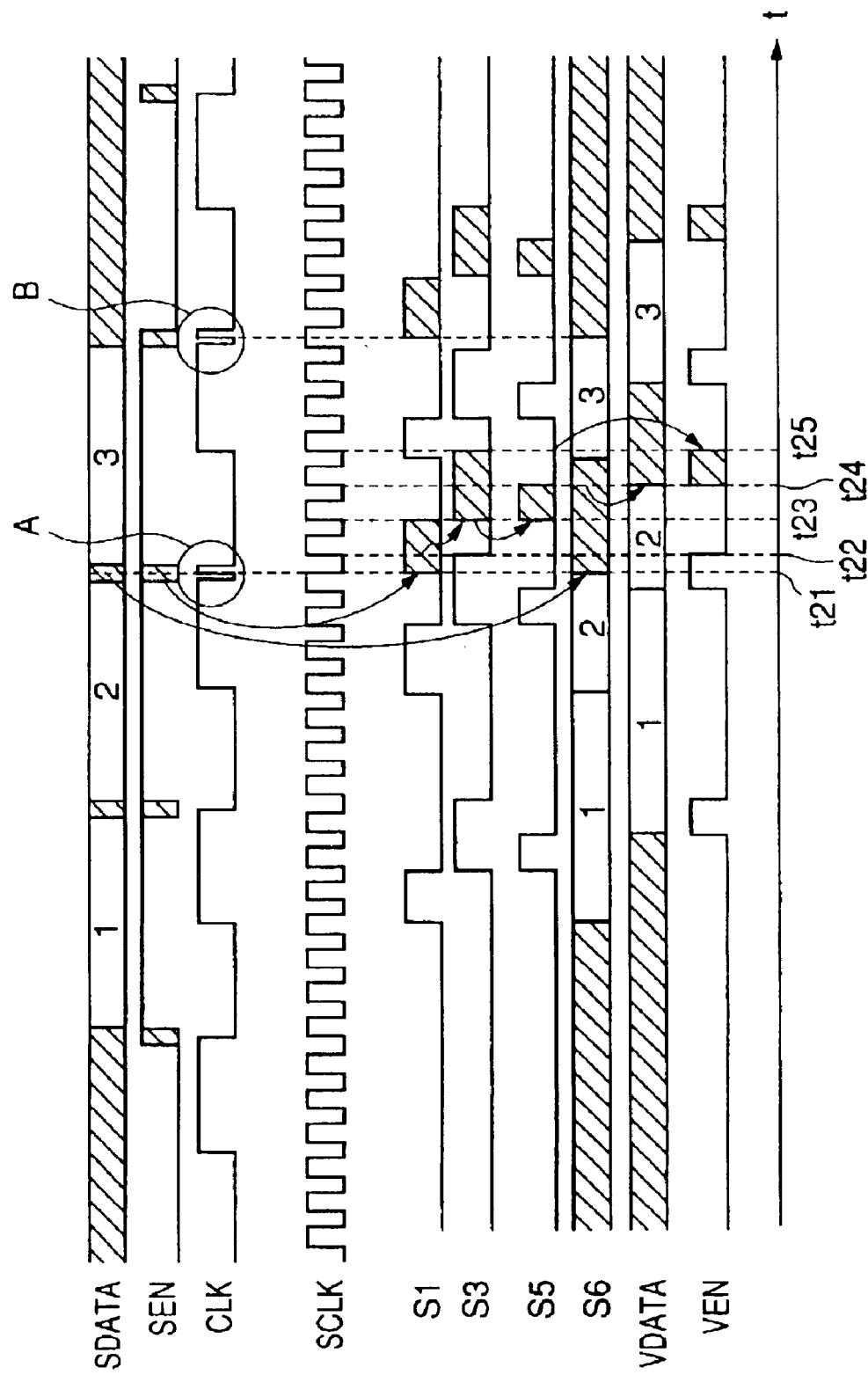
FIG. 17 is a timing chart for the system clock synchronization circuit 124 illustrated in FIG. 15 in the case where the noise is superimposed on the input clock CLK.

Next, the operation of the system clock synchronization circuit illustrated in FIG. 1 will be described with reference to FIG. 1 and the timing chart illustrated in FIG. 3. In FIG. 3, hatched lines stroked down to the lower left designate invalid data, and those to the lower right designates indeterminate data as in FIGS. 13, 16 and 17.

At time t31, synchronizing to the rising edge of the input clock CLK, the flip-flop circuit 142 latches invalid data and sends it out as the signal S6 (when this takes place, the input enable signal Sen is "0"). Moreover, synchronizing to the rising edge of the input clock CLK, the flip-flop circuit 141 latches the input enable signal Sen of "0" level and sends it out as the signal S1.

Next, at time t32, synchronizing to the rising edge of the system clock SCLK, the synchronization and timing delay circuit 11 latches the input clock CLK and, at time t34 which is two cycle duration later of the system clock SCLK, sends it out as the signal S7 of "1" level. Similarly, synchronizing to the rising edge of the system clock SCLK, the synchronization and timing delay circuit 12 latches the signal S1 of "0" level and, at time t33 which is one cycle duration later of the system clock SCLK, sends it out as the signal S9 of "0" level.

Next, at time t33, synchronizing to the rising edge of the system clock SCLK, the synchronization and timing delay circuit 11 latches the input clock CLK and, at time t35 which is two cycle duration later of the system clock SCLK, sends out the signal S7 of "1" level.

Then, at time t34, synchronizing to the rising edge of the signal S7, the mask signal generation circuit 14 sends out the mask signal S8 having a pulse width equal to one cycle duration of system clock SCLK to the AND gate 15. Taking in this signal S8 and the signal S9 of "0" level, the AND gate 15 sends out the "0" level.

Next, at time t35, synchronizing to the rising edge of the system clock SCLK, the synchronization and timing delay circuit 11 latches the input clock CLK of "0" level and, at time t38 which is two cycle duration later of the system clock SCLK, sends it out as the signal S7 of "0" level.

Next, at time t36, synchronizing to the rising edge of the input clock CLK, the flip-flop circuit 142 latches the valid data 1 and sends it out as the signal S6. Consequently, the signal S6 changes from invalid data to valid data 1. Similarly, synchronizing to the rising edge of the input clock CLK, the flip-flop circuit 141 latches the input enable signal Sen of "1" level and sends out to the synchronization and timing delay circuit 12 the signal S1 of "1" level which is to indicate that the signal is valid data.

Moreover, at time t37, synchronizing to the rising edge of the system clock SCLK, the synchronization and timing delay circuit 12 latches the signal S1 of "1" level and, at time t38 which is one cycle duration later of the system clock SCLK, sends it out as the signal S9 of "1" level. Similarly, synchronizing to the rising edge of the system clock SCLK, the synchronization and timing delay circuit 13 latches the valid data 1 and, at time t38 which is one cycle duration later of the system clock SCLK, sends it out as the valid data 1.

Next, at time t39, the AND gate 15 takes in the mask signal S8 which has risen to "1" level and the signal S9 of "1" level and sends out the signal S11 to the flip-flop circuit 146 and the write enable flip-flop circuit 147, the signal S11 rising to the "1" level simultaneously with the input signal, keeping that level for one cycle duration of the system clock SCLK, and falling to the "0" level at time t40.

Next, at time t40, the write enable flip-flop circuit 147 takes in the signal S11 of "1" level at the write enable terminal we and, synchronizing to the rising edge of the system clock SCLK, latches the valid data 1. The latched valid data 1 is sent out as the output data Vdata.

At the same time, synchronizing to the rising edge of the system clock SCLK, the flip-flop circuit 146 latches the signal S11 of "1" level and sends it out as the output enable signal Ven of "1" level.

And, at time t41, the output enable signal Ven which has risen to the "1" level falls to the "0" level simultaneously with the rising edge of the system clock SCLK and is sent out as the signal which keeps the "1" level for a time period between times t40 and t41, i.e., as the signal having a pulse width of one cycle duration of the system clock.

What is described so far is the basic operation of the system clock synchronization circuit according to the present invention: the input clock CLK is synchronized to the system clock SCLK; the signal S7 is produced by delaying the synchronized signal by the first delay amount in synchronization with the system clock SCLK; and the mask signal S8 which is in synchronization with the signal S7 is produced.

On the other hand, the input enable signal Sen is synchronized to the input clock CLK to produce the signal S1, which is then synchronized to the system clock SCLK. And, by delaying this synchronized signal by the second delay amount which is in synchronization with the system clock SCLK, the signal S9 is produced. The circuit configuration is such that, if the signal S9 is either invalid or indeterminate data, then the mask signal S8 becomes "0" to prevent the signal S9 which has become invalid or indeterminate data from entering the flip-flop circuit 146.

Similarly, the input data Sdata is synchronized to the input clock CLK to produce the signal S6, which is then synchronized to the system clock SCLK. And, by delaying this synchronized signal by the third delay amount which is in synchronization with the system clock SCLK, the signal S10 is produced. The circuit configuration is such that, if the signal S10 is either invalid or indeterminate data, then the signal S11 becomes "0" to prevent the write enable flip-flop circuit 147 from latching the invalid or indeterminate data.

Moreover, the first, second and third delay amounts for the synchronization and timing delay circuits 11, 12 and 13, respectively, are determined in such a manner that the mask signal S8 of "0" level enters the AND gate 15 before the signal S9 which becomes invalid or indeterminate data would enter the AND gate 15 and that the signal S11 of "0" level enters the flip-flop circuit 147 at the write enable terminal we before the signal S10 which becomes invalid or indeterminate data would enter the write enable flip-flop circuit 147.

Next, the operation of the system clock synchronization circuit illustrated in FIG. 1 in the case where the noise is superimposed on the falling edge of the input clock CLK will be described with reference to FIG. 4.

At time t41, synchronizing to the falling edge of the input clock CLK, the flip-flop circuit 141 latches the input enable signal Sen which has become indeterminate, and sends it out as the signal S1 to the synchronization and timing delay circuit 12. At time t42, synchronizing to the rising edge of the system clock SCLK, the synchronization and timing delay circuit 12 latches the signal S1 which has become indeterminate and, at time t43 which is one cycle duration later of the system clock SCLK, sends it out as the signal S9 to the AND gate 15.

Similarly, at time t41, synchronizing to the falling edge of the input clock CLK, the flip-flop circuit 142 latches the input data Sdata which has become indeterminate and sends it out as the signal S6 to the synchronization and timing delay circuit 13. At time t42, synchronizing to the rising edge of the system clock SCLK, the synchronization and timing delay circuit 13 latches the signal S6 which has become indeterminate and, at time t43 which is one cycle duration later of the system clock SCLK, sends it out as the signal S10 to the write enable flip-flop circuit 147.

Moreover, since, at time t42, the flip-flop circuit 146 latches the "1" level of the signal S11 and, at time t43 which is one cycle duration later of the system clock SCLK, latches its "0" level, it sends out a signal illustrated as the output enable signal Ven, which rises at time t42 and has a pulse width of one cycle duration of the system clock SCLK.

Moreover, since the signal S11 is of "1" level at time t42, the write enable flip-flop circuit 147 latches the signal S10 (valid data 2), synchronizing to the rising edge of the system clock SCLK.

Next, at time t45, synchronizing to the rising edge of the input clock CLK, the flip-flop circuit 141 latches the input enable signal Sen of "1" level. As a result, the signal S1 changes from indeterminate data to data of "1" level.

Similarly, at time t45, synchronizing to the rising edge of the input clock CLK, the flip-flop circuit 142 latches the valid data 3. As a result, the signal S6 changes from indeterminate data to the valid data 3.

Next, at time t46, synchronizing to the rising edge of the system clock SCLK, the synchronization and timing delay circuit 13 latches the valid data 3. As a result, the signal S10 changes from indeterminate data to the valid data 3.

Next, at time t47, synchronizing to the rising edge of the signal S7, the mask signal S8 rises and so does the signal S11, producing a pulse signal having a pulse width of one cycle duration of the system clock SCLK.

Moreover, synchronizing to the rising edge of the system clock SCLK, the flip-flop circuit 146 latches the signal S11 of "1" level, and sends out the output enable signal Ven which is a pulse signal having a pulse width of one cycle duration of the system clock SCLK. On the other hand, synchronizing to the rising edge of the system clock SCLK, the write enable flip-flop circuit 147 latches the signal S10 (valid data 3) because the signal S11 is of "1" level. As a result, the output data Vdata changes from the valid data 2 to the valid data 3.

Next, the operation of the system clock synchronization circuit described above will be summarized.

1) At time t41, synchronizing to the rising edge due to the noise superimposed on the falling edge of the input clock, the signal S1 which is an indeterminate signal is sent out from the flip-flop circuit 141. This indeterminate data continues until time t45, which is the next rising edge of the input clock CLK.

2) At time t42, synchronizing to the rising edge of the system clock SCLK, the synchronization and timing delay circuit 12 latches the indeterminate data of 1) above. The latched data changes to the "1" level at time t46, which is about one cycle duration later of the system clock SCLK from the time when the signal S1 changes to the "1" level.

3) The mask signal S8 continues the "0" level until one cycle duration later of the system clock SCLK from time t46. Therefore, the signal S9 which is indeterminate data is masked by the mask signal S8 so that the indeterminate data is not sent out from the AND gate 15.

4) The signal S11, which rises in synchronization with the rising edge of the system clock SCLK at time t47 and indicates that it is valid data, is sent out from the AND gate 15 and is eventually sent out as the output enable signal Ven which rises at time t48.

11) At time t41, synchronizing to the rising edge due to the noise superimposed on the falling edge of the input clock, the signal S6 which is an indeterminate signal is sent out from the flip-flop circuit 142. This indeterminate data continues until time t45, which is the next rising edge of the input clock CLK.

12) At time t42, synchronizing to the rising edge of the system clock SCLK, the synchronization and timing delay circuit 13 latches the indeterminate data of 11) above. This indeterminate data changes to the valid data 3 at time t46, which is about one cycle duration later of the system clock SCLK from the time when the signal S6 changes to the valid data 3.

13) The signal S11 continues the "0" level until one cycle duration later of the system clock SCLK from time t46. Therefore, the signal S10 which is indeterminate data is substantially masked by the signal S11, thereby not being latched by the write enable flip-flop circuit 147.

14) At time t48, synchronizing to the rising edge of the system clock SCLK, the write enable flip-flop circuit 147 latches the signal S10 which is the valid data 3 and sends it out as the output data Vdata.

As described above, even if indeterminate signals occur in the flip-flop circuits 141 and 142, synchronizing to the rising edge due to noise superimposed on the falling edge of the input clock, the indeterminate data does not enter the flip-flop circuit 146 and the write enable flip-flop circuit 147 because of the mask signals S8 and S11.

It is necessary that the mask signals S8 and S11 be of "0" level while each of the signal S9 and S10 is indeterminate data. This timing condition is satisfied by adjusting the first, second and third delay amounts of the synchronization and timing delay circuits 11, 12 and 13, respectively.

Next, a case where the clock frequency of the system clock SCLK' becomes lower than that of the system clock SCLK illustrated in FIG. 4 will be described with reference to FIG. 5. FIG. 5 is the same as FIG. 4 with respect to the system clock synchronization circuit, the input clock CLK, the input data Sdata, the input enable signal Sen, and the noise superimposed on the falling edge of the input clock CLK, except for the frequency of the system clock SCLK' which is lower than that of the system clock SCLK.

Figure 4:
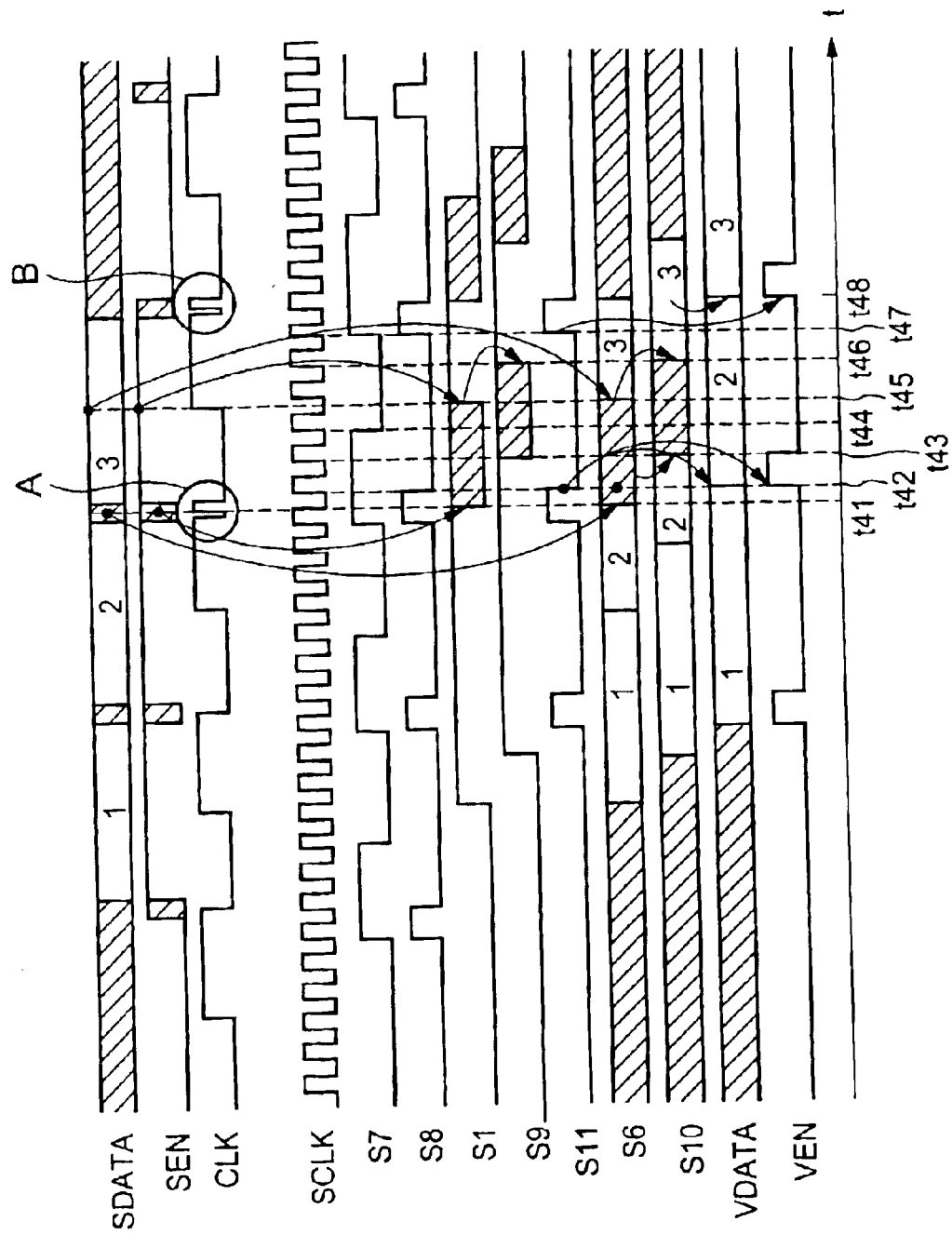
FIG. 4 is a timing chart for the system clock synchronization circuit illustrated in FIG. 1 in the case where the noise is superimposed on the input clock CLK.
Figure 5:
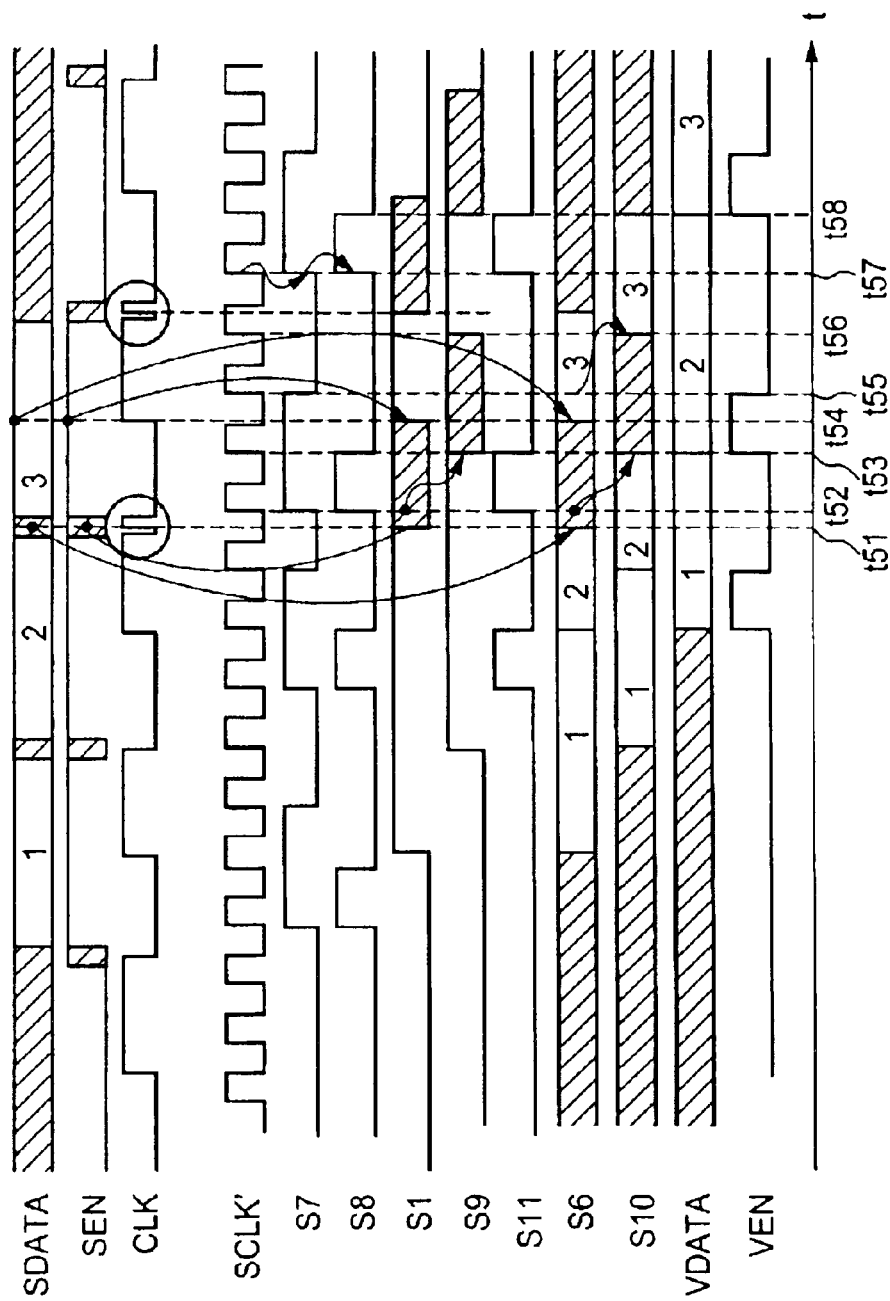
FIG. 5 is a timing chart for the system clock synchronization circuit illustrated in FIG. 1 in the case where the system clock SCLK' is slower than the system clock SCLK illustrated in FIG. 4 and the noise is superimposed on the input clock CLK.

The circuit operation in the case of FIG. 5 becomes almost the same as the circuit operation illustrated in FIG. 4. However, if the clock frequency of the system clock SCLK' becomes smaller than that of the input clock CLK by a certain ratio, then the signal S9 which has become indeterminate data can no longer be masked by the mask signal S8.

Next, this phenomenon mentioned above will be described.

Time t56 at which the signal S9 changes from indeterminate data to the "1" level is, in the case of FIG. 5, when the system clock SCLK rises about one and a half cycle duration later of the system clock SCLK from time t54. If the clock frequency of the system clock SCLK decreases, then time t56 shifts in such a direction that time t56 moves away from t54.

In order for the mask signal S8 to be able to mask the signal S9, the interval between times t56 and t58 must at least be larger than one cycle duration of the system clock. However, if the clock frequency of the system clock SCLK becomes small, then a mask signal which stretches for one cycle duration of the system clock SCLK cannot be generated between times t56 and t58.

Considering the typical timing condition, it is necessary that a time period over which the input clock CLK is "1" level (half the complete cycle of the input clock signal) be latched twice or more at the rising edge of the system clock SCLK. That is to say that the clock frequency of the system clock SCLK needs to be four times or more that of the input clock CLK. The system clock synchronization circuits of FIGS. 1 and 2 were designed such that the clock frequencies were 12.5 MHz for the input clock CLK and 66 to 100 MHz for the system clock SCLK.

Furthermore, in addition to the first constraint described above, the second constraint is necessary that the first delay amount of the synchronization and timing delay circuit 11 be larger than the second and third delay amounts of the synchronization and timing delay circuits 12 and 13, respectively, as described before. This second constraint means that the number of latching stages in the synchronization and timing delay circuit 11 by flip-flop circuits, etc. for a period over which the input clock CLK is synchronized to the system clock SCLK and sent out as the signal S7 is larger than the number of latching stages in the synchronization and timing delay circuit 12 by flip-flop circuits, etc. for a period over which the input enable signal Sen synchronized to the input clock signal CLK is synchronized to the system clock SCLK and sent out as the signal S9, and the number of latching stages in the synchronization and timing delay circuit 13 by flip-flop circuits, etc. for a period over which the input data Sdata synchronized to the input clock signal CLK is synchronized to the system clock SCLK and sent out as the signal S10.

Figure 2:
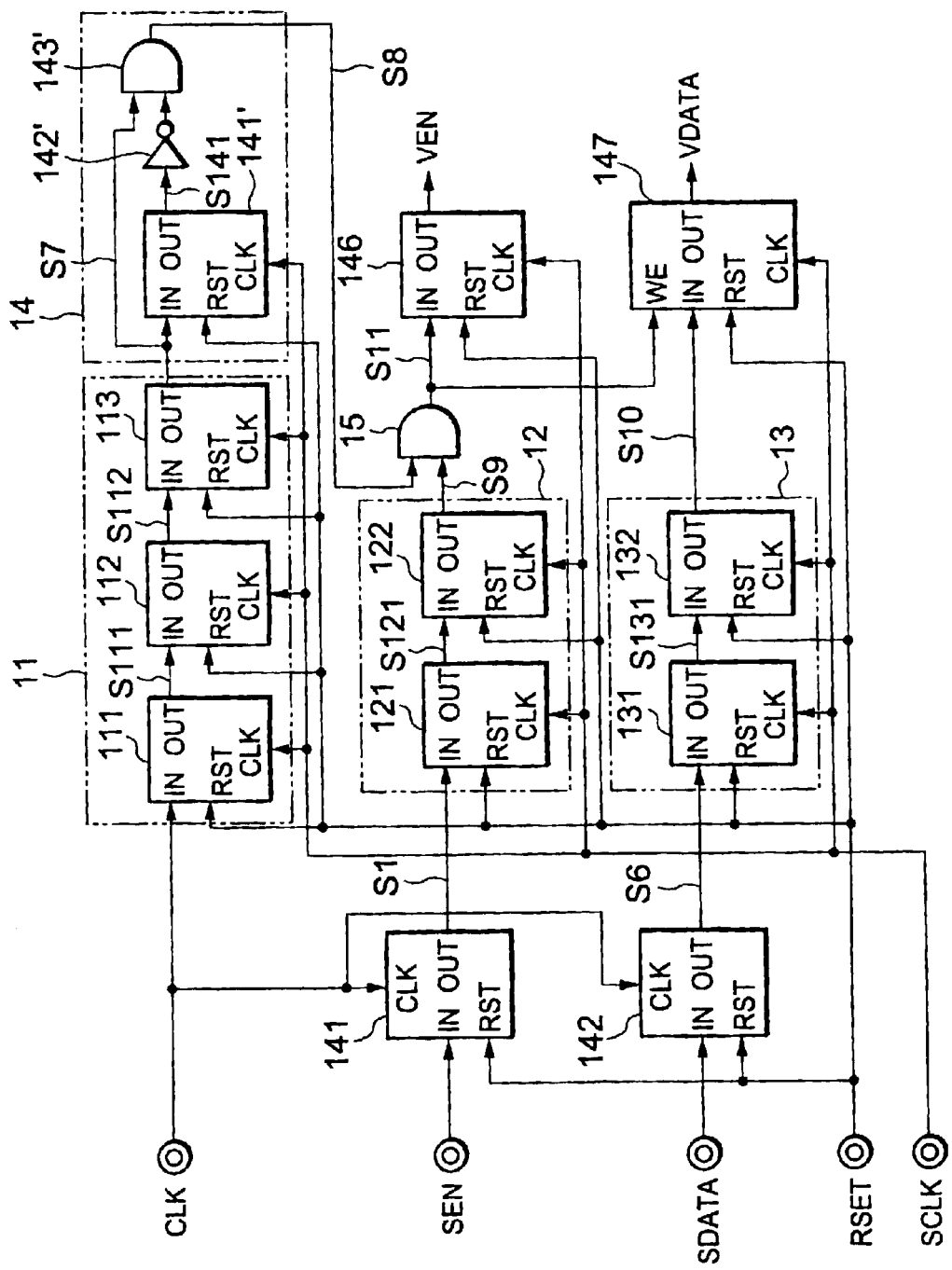
FIG. 2 is a detailed circuit diagram illustrating the first example of the system clock synchronization circuit according to the present invention.

In the example of FIG. 2, the synchronization and timing delay circuit 11 has three flip-flop circuits in cascade connection which are synchronized to the system clock SCLK, and the synchronization and timing delay circuits 12 and 13 have two flip-flop circuits in cascade connection which are synchronized to the system clock SCLK, thereby satisfying the second constraint mentioned above.

As described above, the first, second and third delay amounts are adjusted by changing the number of cascade connections of the flip-flop circuits which constitute the synchronization and timing delay circuit.

Figure 6:
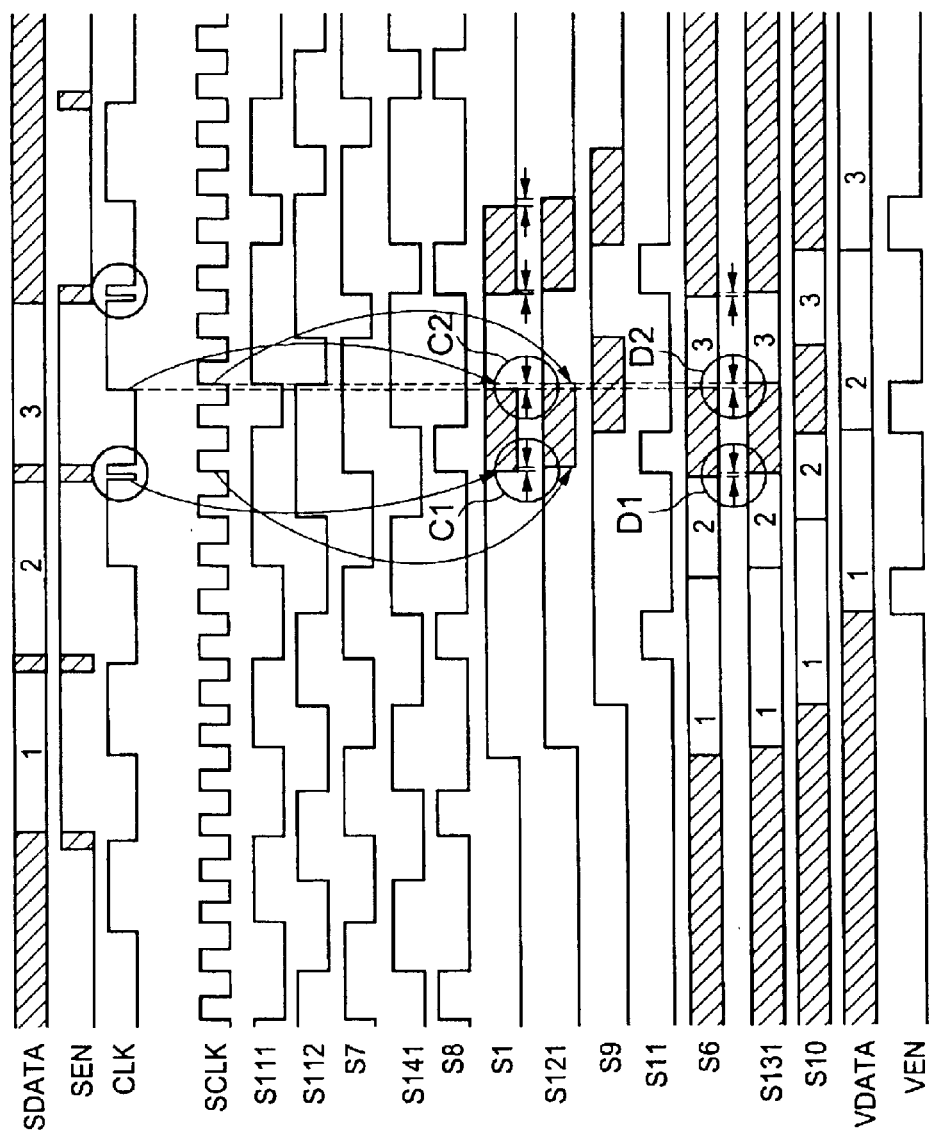
FIG. 6 is a timing chart for the system clock synchronization circuit illustrated in FIG. 2 in the case where a time difference between the rising edge due to the noise superimposed on the input clock CLK and that of the system clock is small and the noise is superimposed on the input clock CLK.
Figure 7:
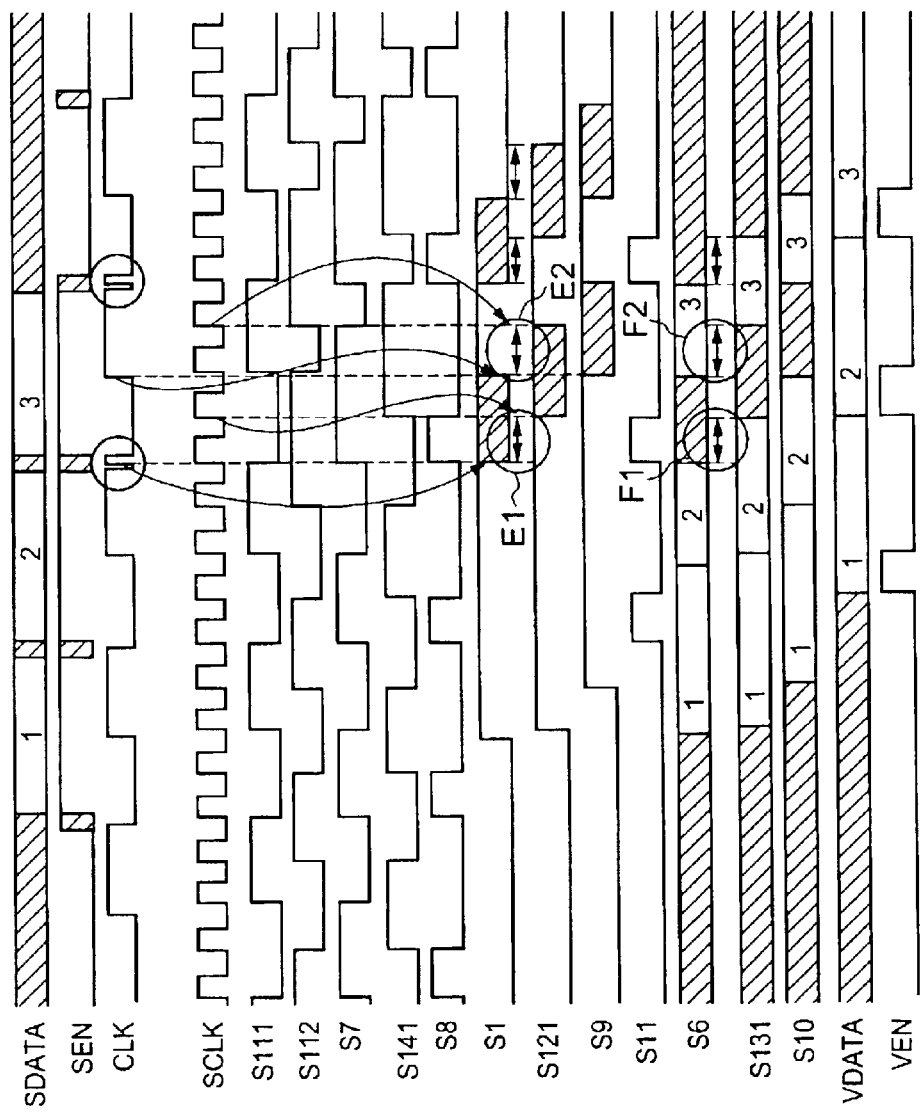
FIG. 7 is a timing chart for the system clock synchronization circuit illustrated in FIG. 2 in the case where a time difference between the rising edge due to the noise on the input clock CLK and that of the system clock is large and the noise is superimposed on the input clock CLK.

The input enable signal Sen is latched in synchronization with the input clock CLK in the flip-flop circuit 141, and the signal S1 is latched in synchronization with the system clock SCLK in the synchronization and timing delay circuit 12. However, since the input clock CLK and the system clock SCLK are asynchronous, there is a certain delay between the output of the signal S1 from the flip-flop circuit 141 and the latch in the synchronization and timing delay circuit 12 as illustrated by C1 and C2 in FIG. 6 and E1 and E2 in FIG. 7.

In the case of C1 and C2, the flip-flop circuit 121 latches the indeterminate signal S1 on the rising edge of the system clock immediately after the rising edge of the noise, but in the case of E1 and E2, the flip-flop circuit 121 latches the indeterminate signal S1 on the rising edge of the system clock which is one cycle duration later of the system clock after the rising edge of the noise. Therefore, due to a minute misalignment of rising edges between the noise and the system clock, the timing of the signal S1 which is latched in the flip-flop circuit 121 differs greatly.

Similarly, the input data Sdata is latched in synchronization with the input clock CLK in the flip-flop circuit 142, and the signal S6 is latched in synchronization with the system clock SCLK in the synchronization and timing delay circuit 13. However, due to the slight misalignment of rising edges between the noise and the system clock, the timing of the signal S6 which is latched by the flip-flop circuit 131 differs greatly as illustrated by D1 and D2 in FIG. 6 and F1 and F2 in FIG. 7.

However, even in such a case, by providing the first and second constraints, the misalignment of latch timing due to the fact that the input clock CLK and the system clock SCLK are asynchronous can be corrected, thereby sending out only the correct input data Sdata and the correct input enable signal Sen as the output data Vdata and the output enable signal Ven, respectively.

Next, the second example of the system clock synchronization circuit according to the present invention will be described with reference to FIGS. 1 and 8.

Figure 8:
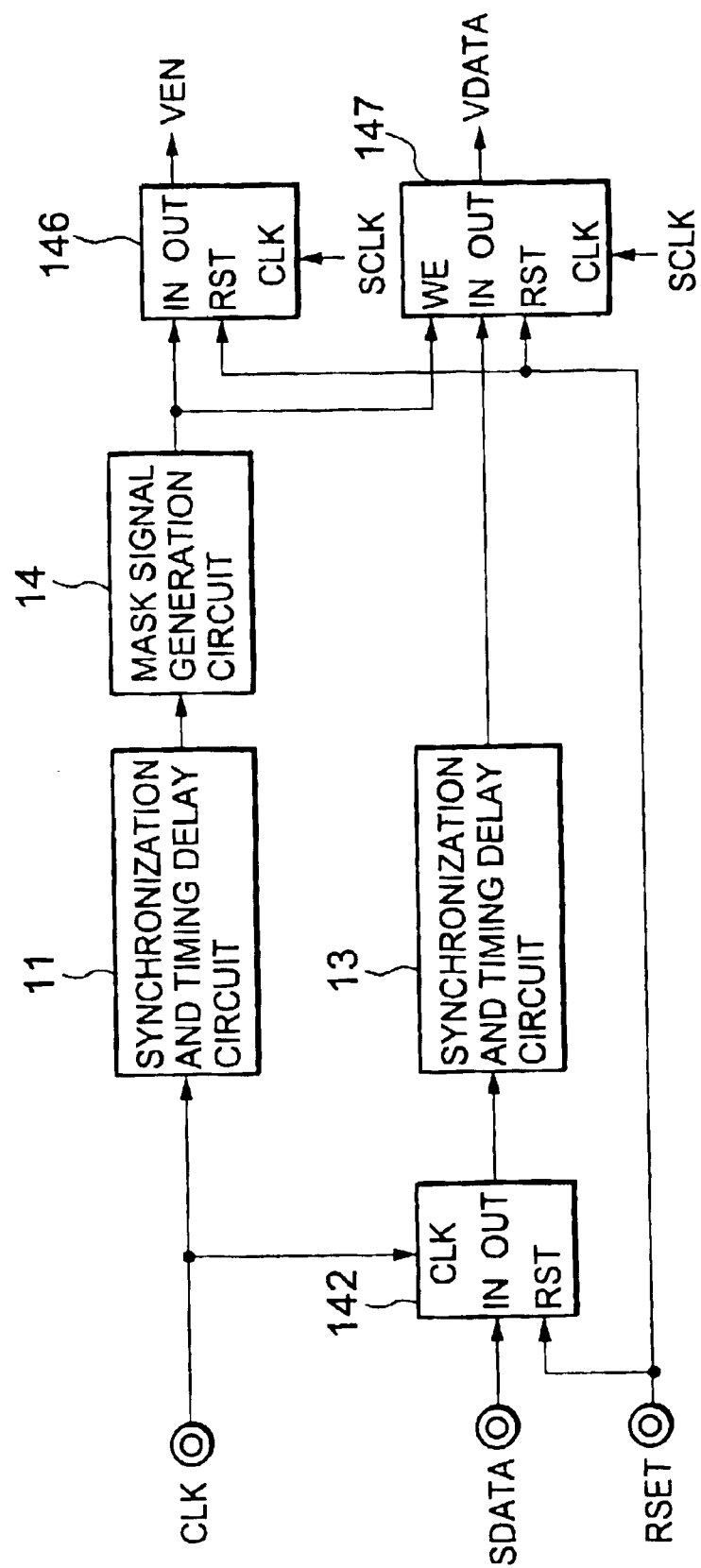
FIG. 8 is a block diagram illustrating the second example of the system clock synchronization circuit according to the present invention.

FIG. 8 is a block diagram illustrating the second example of the system clock synchronization circuit according to the present invention, which corresponds to the circuit configuration of FIG. 1 where the input enable signal Sen is constantly "1".

If the input enable signal Sen is constantly "1", then the synchronization and timing delay circuit 12 constantly sends out "1", and the AND gate 15 becomes unnecessary. Therefore, the circuit configuration of FIG. 1 from which the flip-flop circuit 141, the synchronization and timing delay circuit 12 and the AND gate 15 have been removed corresponds to that of FIG. 8. The circuit configuration of FIG. 8 is characterized in that the number of circuit elements is smaller than in FIG. 1 where the input terminal of the flip-flop circuit 141 is constantly pulled up to "1".

Next, the third example of the system clock synchronization circuit according to the present invention will be described with reference to FIGS. 1 and 9.

Figure 9:
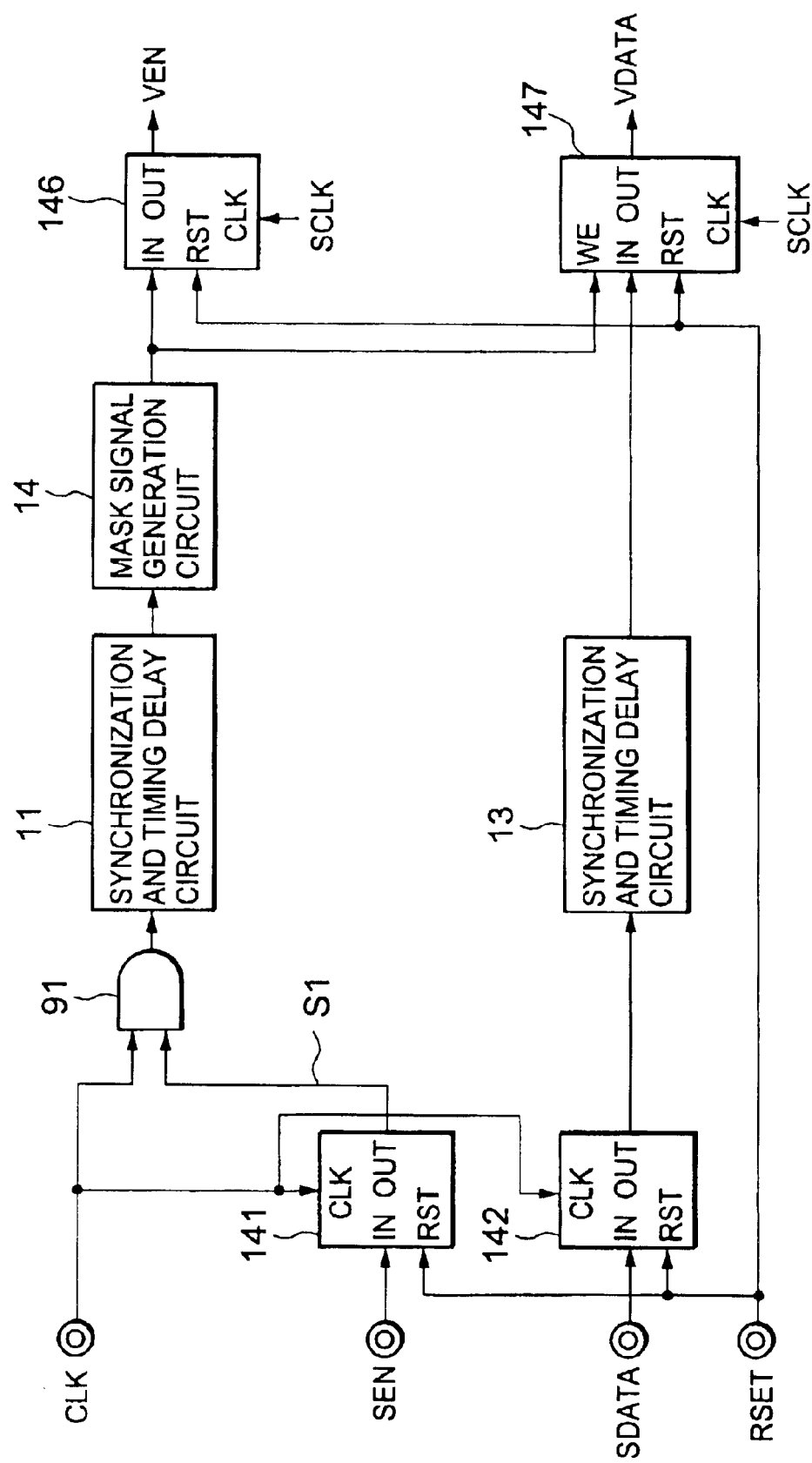
FIG. 9 is a block diagram illustrating the third example of the system clock synchronization circuit according to the present invention.

FIG. 9 is a block diagram illustrating the third example of the system clock synchronization circuit according to the present invention.

In FIG. 1, indeterminate data of the signal S9 was masked by sending the mask signal S8 generated in the mask signal generation circuit 14 to one of the terminals of the AND gate 15. However, the circuit operation similar to that of the system clock synchronization circuit illustrated in FIG. 1 can be realized by: as in FIG. 9, first sending the input clock CLK and the signal S1 sent out from the flip-flop circuit 141 to the AND gate 91; sending the signal sent out from this AND gate 91 to the synchronization and timing delay circuit 11; generating a mask signal in the mask signal generation circuit 14 from the signal sent out from the synchronization and timing delay circuit 11; and sending this mask signal to both the input terminal of the flip-flop circuit 146 and the write enable terminal we of the write enable flip-flop circuit 147.

That is, in FIG. 9, instead of taking a logical product of the signal S9 and the mask signal S8 as in FIG. 1, a logical product of the input clock CLK and the signal S1 is taken, and then the signal of this logical product is processed in the downstream of the synchronization and timing delay circuit 11 in FIG. 9.

Next, the fourth example of the system clock synchronization circuit according to the present invention will be described with reference to FIGS. 1 and 10.

Figure 10:
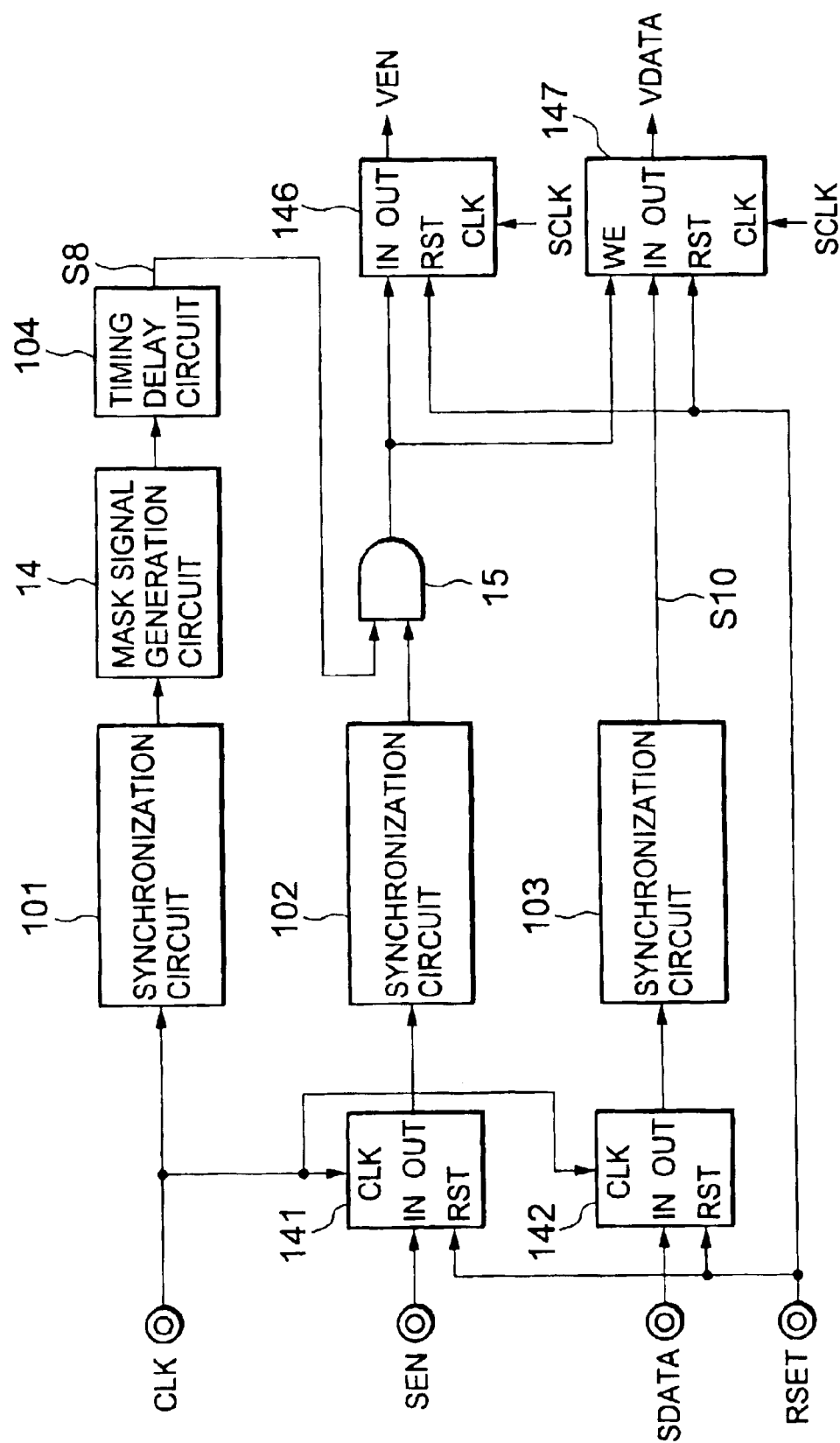
FIG. 10 is a block diagram illustrating the fourth example of the system clock synchronization circuit according to the present invention.

FIG. 10 is a block diagram illustrating the fourth example of the system clock synchronization circuit according to the present invention. The synchronization and timing delay circuits 11, 12 and 13 in FIG. 1 synchronized the input signal to the system clock SCLK and delayed this synchronized signal by the first, second and third delay amounts, respectively, thereby adjusting the timing among each other. However, the synchronization circuits 101, 102 and 103 which constitute the system clock synchronization circuits of the present example respectively synchronize the input clock CLK, the input enable signal Sen which is synchronized to the input clock CLK and the input data Sdata which is synchronized to the input clock CLK to the system clock SCLK, and send out these synchronized signals but do not delay the synchronized signals.

The timing adjustment for the entire system clock synchronization circuit is conducted by a timing delay circuit 104. This timing delay circuit 104 is set in such a manner that the delay between the input to the synchronization circuit 101 and the output from the timing delay circuit 104 through the mask signal generation circuit 14 is larger than the delay between the input to and the output from the synchronization circuit 102 and the delay between the input to and the output from the synchronization circuit 103. By providing such a setting, the second constraint described above can be satisfied.

Since the system clock synchronization circuit according to the present example does not include any delay circuits along the transmission path through which the input enable signal Sen and the input data Sdata travel, the input enable signal Sen and the input data Sdata can travel through the transmission path fast. As a result, the speedup of the system clock synchronization circuit can be achieved, and a digital broadcast reception device which processes signals fast can be realized.

Next, the fifth example of the system clock synchronization circuit according to the present invention will be described with reference to FIGS. 1 and 11.

Figure 11:
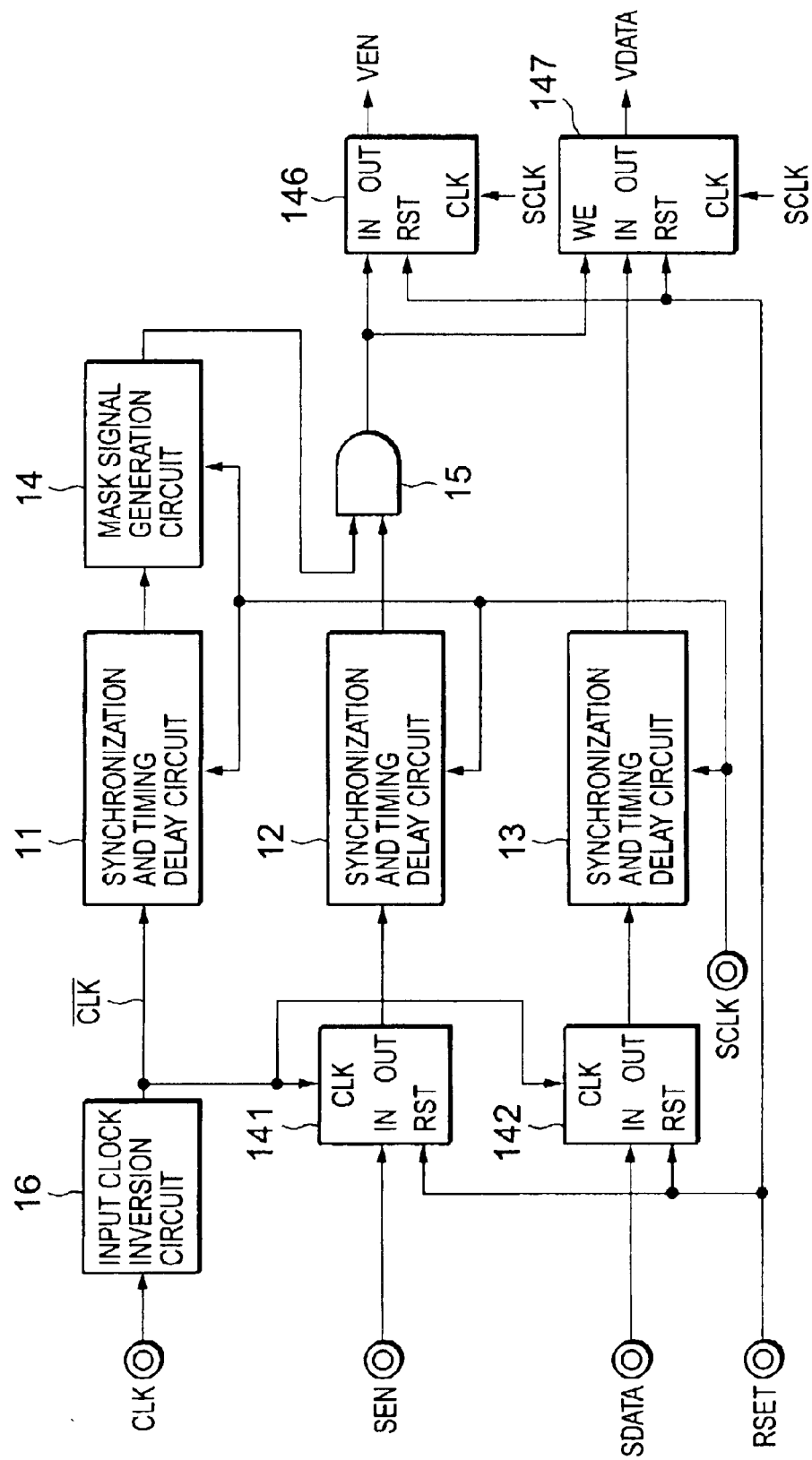
FIG. 11 is a block diagram illustrating the fifth example of the system clock synchronization circuit according to the present invention.

FIG. 11 is a block diagram illustrating the fifth example of the system clock synchronization circuit according to the present invention. The system clock synchronization circuits described so far all operated in such a manner that the input data Sdata and the input enable signal Sen changed in synchronization to the falling edge of the input clock CLK and the input data Sdata and the input enable signal Sen were latched in synchronization to the rising edge of the input clock CLK. However, the system clock synchronization circuit according to the present example is for a case where the input data Sdata and the input enable signal Sen change in synchronization to the rising edge of the input clock CLK and the input data Sdata and the input enable signal Sen are latched in synchronization to the falling edge of the input clock CLK.

The system clock synchronization circuit according to the present example is characterized in that an input clock inversion circuit 16 for inverting the input clock CLK has been added to the system clock synchronization circuit illustrated in FIG. 1, the input clock inversion circuit 16 sending out the inverted input clock CLK-barred, which is an inversion of the input clock CLK, to the flip-flop circuits 141 and 142 and the synchronization and timing delay circuit 11.

The circuit operates in a manner similar to the system clock synchronization circuit of FIG. 1 except that the inverted input clock CLK-barred replaces the input clock CLK.

As duly described so far, even in the case where the noise is superimposed on the input clock, the system clock synchronization circuit of the present invention does not send out wrong output data and wrong output enable signal but is capable of sending out correct output data and a correct output enable signal which are synchronized to the system clock.

Moreover, the large misalignment of latch timings when latching the input data and the input enable signal due to the fact that the input clock and the system clock are asynchronous can be corrected, and only correct input data and a correct input enable signal can be sent out as the input data and the input enable signal, respectively.

Moreover, by setting a clock frequency of the system clock over a range greater than a certain ratio to the input clock frequency, depending on the input clock frequency, correct output data and a correct output enable signal which are without any errors due to the input clock superimposed with the noise and synchronized to the system clock can be sent out over a wide range of the input clock frequencies.

Although the invention has been described with reference to specific embodiments, this description is not meant to be construed in a limiting sense. Various modifications of the disclosed embodiments will become apparent to persons skilled in the art upon reference to the description of the invention. It is therefore contemplated that the appended claims will cover any modifications or embodiments as fall within the true scope of the invention.

What is claimed is:

1. A system clock synchronization circuit comprising:
   a first synchronization and timing delay circuit synchronizing an input clock with a system clock and sending out a first signal which is obtained by delaying the synchronized signal by a first delay amount;
   an input data latching means for latching input data which changes at a first changing point of said input clock, said latching being in synchronization with a second changing point of said input clock;
   an input enable signal latching means for latching in synchronization with said input clock an input enable signal which is active when said input data is valid and inactive when said input data is invalid;
   a mask signal generation circuit generating in synchronization with said first signal a mask signal which has a prescribed pulse width;
   a second synchronization and timing delay circuit synchronizing a signal sent out from said input data latching means with said system clock and sending out a second signal which is obtained by delaying the synchronized signal by a second delay amount;
   a third synchronization and timing delay circuit synchronizing a signal sent out from said input enable signal latching means with said system clock and sending out a third signal which is obtained by delaying the synchronized signal by a third delay amount;
   a masking means for taking in said mask signal and said third signal, sending out said third signal when said mask signal is active, and masking said third signal when said mask signal is inactive;
   a first output latching means for latching in synchronization with said system clock a fourth signal from said masking means and sending out an output enable signal; and
   a second output latching means for taking in said fourth signal at a write enable terminal and said second signal at a data input terminal, latching in synchronization with said system clock said second signal when said fourth signal is active, and holding and sending out as output data said second signal which is taken immediately before when said fourth signal is inactive.

2. A system clock synchronization circuit according to claim 1, wherein said input data latching means and said input enable signal latching means are a flip-flop circuit which latches in synchronization with said input clock said input data and said input enable signal.

3. A system clock synchronization circuit according to claim 1, wherein said second synchronization and timing delay circuit comprises a multiplicity of flip-flop circuits arranged in cascade connection, a first of said flip-flop circuits taking in said input data and a last of said flip-flop circuits sending out said second signal.

4. A system clock synchronization circuit according to claim 1, wherein said third synchronization and timing delay circuit comprises a multiplicity of flip-flop circuits arranged in cascade connection, a first of said flip-flop circuits taking in said input enable signal and a last of said flip-flop circuits sending out said third signal.

5. A system clock synchronization circuit according to claim 1, wherein said masking means comprises an AND gate.

6. A system clock synchronization circuit according to claim 1, wherein said mask signal generation circuit comprises: a flip-flop circuit which sends out in synchronization with said system clock said first signal; an inverter which inverts an output of said flip-flop circuit; and an AND gate which takes in said first signal and a signal sent out from said inverter and sends out said mask signal.

7. A system clock synchronization circuit according to claim 1, wherein said first delay amount is larger than said second delay amount and said third delay amount.

8. A system clock synchronization circuit according to claim 1, wherein a frequency of said system clock is four time or more larger than a frequency of said input clock.

9. A system clock synchronization circuit according to claim 1, wherein said prescribed pulse width is equal to one cycle duration of said system clock.

10. A system clock synchronization circuit comprising:

a first synchronization and timing delay circuit synchronizing an input clock with a system clock and sending out a first signal which is obtained by delaying the synchronized signal by a first delay amount;

an input data latching means for latching input data which changes at a first changing point of said input clock, said latching being in synchronization with a second changing point of said input clock;

a mask signal generation circuit generating in synchronization with said first signal a mask signal which has a prescribed pulse width;

a second synchronization and timing delay circuit synchronizing a signal sent out from said input data latching means with said system clock and sending out a second signal which is obtained by delaying the synchronized signal by a second delay amount;

a first output latching means for latching in synchronization with said system clock said mask signal and sending out an output enable signal; and a second output latching means for taking in said mask signal at a write enable terminal and said second signal at a data input terminal, latching in synchronization with said system clock said second signal when said mask signal is active, and holding and sending out as output data said second signal which is taken immediately before when said mask signal is inactive.

11. A system clock synchronization circuit comprising:

an input data latching means for latching input data which changes at a first changing point of an input clock, said latching being in synchronization with a second changing point of said input clock;

an input enable signal latching means for latching in synchronization with said input clock an input enable signal which is active when said input data is valid and inactive when said input data is invalid;

an AND gate taking in said input clock and a signal sent out from said input enable signal latching means;

a first synchronization and timing delay circuit synchronizing a signal sent out from said AND gate with said system clock and sending out a first signal which is obtained by delaying the synchronized signal by a first delay amount;

a mask signal generation circuit generating in synchronization with said first signal a mask signal which has a prescribed pulse width;

a second synchronization and timing delay circuit synchronizing a signal sent out from said input data latching means with said system clock and sending out a second signal which is obtained by delaying the synchronized signal by a second delay amount;

a first output latching means for latching in synchronization with said system clock said mask signal and sending out an output enable signal; and a second output latching means for taking in said mask signal at a write enable terminal and said second signal at a data input terminal, latching in synchronization with said system clock said second signal when said mask signal is active, and holding and sending out as output data said second signal which is taken immediately before when said mask signal is inactive.

12. A system clock synchronization circuit comprising:

a first synchronization circuit latching in synchronization with a system clock an input clock and sending out as a first signal;

an input data latching means for latching input data which changes at a first changing point of said input clock, said latching being in synchronization with a second changing point of said input clock;

an input enable signal latching means for latching in synchronization with said input clock an input enable signal which is active when said input data is valid;

a mask signal generation circuit generating in synchronization with said first signal a mask signal which has a prescribed pulse width;

a timing delay circuit delaying said mask signal with prescribed timing and sending it out as a delayed mask signal;

a second synchronization circuit sending out a second signal which is obtained by synchronizing with said system clock a signal sent out from said input data latching means;

a third synchronization circuit sending out a third signal which is obtained by synchronizing with said system clock a signal sent out from said input enable signal latching means;

a masking means for taking in said delayed mask signal and said third signal, sending out said third signal when said delayed mask signal is active, and masking said third signal when said delayed mask signal is inactive;

a first output latching means for latching in synchronization with said system clock a fourth signal from said masking means and sending out an input enable signal; and a second output latching means for taking in said fourth signal at a write enable terminal and said second signal at a data input terminal, latching in synchronization with said system clock said second signal when said fourth signal is active, and holding and sending out as output data said second signal which is taken immediately before when said fourth signal is inactive.

13. A system clock synchronization circuit comprising:

an input clock inversion circuit generating an inverted input clock which is an inversion of an input clock;

a first synchronization and timing delay circuit synchronizing said inverted input clock with a system clock and sending out a first signal which is obtained by delaying the synchronized signal by a first delay amount;

an input data latching means for latching an input data which changes at a first changing point of said inverted input clock, said latching being in synchronization with a second changing point of said inverted input clock;

an input enable signal latching means for latching in synchronization with said inverted input clock an input enable signal which is active when said input data is valid and inactive when said input data is invalid;

a mask signal generation circuit generating in synchronization with said first signal a mask signal which has a prescribed pulse width;

a second synchronization and timing delay circuit synchronizing a signal sent out from said input data latching means with said system clock and sending out a second signal which is obtained by delaying the synchronized signal by a second delay amount;

a third synchronization and timing delay circuit synchronizing a signal sent out from said input enable signal latching means with said system clock and sending out a third signal which is obtained by delaying the synchronized signal by a third delay amount;

a masking means for taking in said mask signal and said third signal, sending out said third signal when said mask signal is active, and masking said third signal when said mask signal is inactive;

a first output latching means for latching in synchronization with said system clock a fourth signal from said masking means and sending out an output enable signal; and a second output latching means for taking in said fourth signal at a write enable terminal and said second signal at a data input terminal, latching in synchronization with said system clock said second signal when said fourth signal is active, and holding and sending out as output data said second signal which is taken immediately before when said fourth signal is inactive.

* * * * *